US011410283B2

(12) United States Patent
Jeong et al.

(10) Patent No.: US 11,410,283 B2
(45) Date of Patent: Aug. 9, 2022

(54) ELECTRONIC DEVICE AND CONTROL METHOD THEREOF

(71) Applicants: SAMSUNG ELECTRONICS CO., LTD., Suwon-si (KR); PUKYONG NATIONAL UNIVERSITY INDUSTRY-UNIVERSITY COOPERATION FOUNDATION, Busan (KR)

(72) Inventors: Younghoon Jeong, Suwon-si (KR); Hoang Nam Nguyen, Busan (KR); Chul Lee, Busan (KR); Joseph Kim, Suwon-si (KR); Youngsu Moon, Suwon-si (KR); Van Tu Vo, Busan (KR); Jaemoon Lim, Suwon-si (KR)

(73) Assignees: SAMSUNG ELECTRONICS CO., LTD., Suwon-si (KR); PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 0 days.

(21) Appl. No.: 17/275,820

(22) PCT Filed: Feb. 8, 2019

(86) PCT No.: PCT/KR2019/001589
§ 371 (c)(1),
(2) Date: Mar. 12, 2021

(87) PCT Pub. No.: WO2020/054927
PCT Pub. Date: Mar. 19, 2020

(65) Prior Publication Data
US 2022/0051378 A1    Feb. 17, 2022

(30) Foreign Application Priority Data
Sep. 14, 2018   (KR) .......................... 10-2018-0110539

(51) Int. Cl.
*G06T 5/40*   (2006.01)
*G06V 10/50*  (2022.01)
(Continued)

(52) U.S. Cl.
CPC .............. *G06T 5/40* (2013.01); *G06T 5/001* (2013.01); *G06V 10/50* (2022.01); *G09G 3/20* (2013.01);
(Continued)

(58) Field of Classification Search
CPC ................ G06T 5/40; G06K 9/4642; G09G 2320/0271; G09G 2360/16
See application file for complete search history.

(56) References Cited

U.S. PATENT DOCUMENTS 8,355,030 B2   1/2013  Lin
8,989,484 B2   3/2015  Moon et al.
(Continued)

FOREIGN PATENT DOCUMENTS

KR   10-2011-0048811 A    5/2011
KR      10-1448494 B1    10/2014
(Continued)

OTHER PUBLICATIONS

Communication dated Jul. 15, 2021, from the European Patent Office in European Application No. 19859815.3.
(Continued)

*Primary Examiner* — Phi Hoang
(74) *Attorney, Agent, or Firm* — Sughrue Mion, PLLC

(57) ABSTRACT

Disclosed is an electronic device. The electronic device obtains a first histogram regarding a difference in gradation between adjacent pixels of an input image based on the first maximum output brightness, obtains a second histogram regarding a difference in gradation between the adjacent pixels of the input image based on the second maximum
(Continued)

output brightness, obtains a third histogram regarding a difference in brightness between the adjacent pixels of the input image based on the first HVS recognition information, obtains a fourth histogram regarding a difference in brightness between the adjacent pixels of the input image based on the second HVS recognition information, and obtains a brightness value regarding the input image corresponding to the second maximum output brightness based on a difference between a first value obtained based on information on the first and third histograms and a second value obtained based on the second and fourth histograms.

14 Claims, 15 Drawing Sheets

(51) Int. Cl.
*G06T 5/00* (2006.01)
*G09G 3/20* (2006.01)

(52) U.S. Cl.
CPC .............. *G09G 2320/0271* (2013.01); *G09G 2320/0686* (2013.01); *G09G 2340/045* (2013.01); *G09G 2360/16* (2013.01)

(56) References Cited

U.S. PATENT DOCUMENTS

| | | | |
|---|---|---|---|
| 9,076,224 | B1 | 7/2015 | Shah et al. |
| 9,299,317 | B2 | 3/2016 | Ward |
| 9,830,693 | B2 | 11/2017 | Park |
| 10,275,865 | B2 | 4/2019 | Nam |
| 10,861,384 | B1* | 12/2020 | Yang .................. G09G 3/3208 |
| 2004/0004666 | A1* | 1/2004 | Sano .................. H04N 5/235 348/254 |
| 2008/0018795 | A1 | 1/2008 | Miyazawa |
| 2011/0129149 | A1 | 6/2011 | Kang |
| 2013/0120660 | A1* | 5/2013 | Akita .................. H04N 5/57 348/687 |
| 2017/0085896 | A1 | 3/2017 | Ramasubramonian et al. |
| 2017/0228594 | A1* | 8/2017 | Takemoto .......... G06K 9/4642 |
| 2017/0272690 | A1 | 9/2017 | Seifi et al. |

FOREIGN PATENT DOCUMENTS

| | | |
|---|---|---|
| KR | 10-2015-0002440 A | 1/2015 |
| KR | 10-1538296 B1 | 7/2015 |
| KR | 10-2016-0017387 A | 2/2016 |
| KR | 10-1633110 B1 | 6/2016 |
| KR | 10-1699919 B1 | 1/2017 |
| KR | 10-2017-0129004 A | 11/2017 |
| KR | 10-2018-0056726 A | 5/2018 |

OTHER PUBLICATIONS

Rafal Mantiuk et al., "Display Adaptive Tone Mapping", Aug. 1, 2008, 10 pages total.
Turgay Celik et al., "Contextual and Variational Contrast Enhancement", IEEE, Dec. 2011, pp. 1-19, 20 pages total.
Turgay Celik, "Two-dimensional histogram equalization and contrast enhancement", Pattern Recognition, 45, Oct. 2012, pp. 3810-3824, 15 pages total.
Chulwoo Lee et al., "Contrast Enhancement Based on Layered Difference Representation of 2D Histograms", IEEE, Dec. 2013, pp. 1-13, 13 pages total.
"High Dynamic Range Electro-Optical Transfer Function of Mastering Reference Displays", SMPTE ST 2084, 2014, 14 pages total.
H. Richard Blackwell, "Contrast Thresholds of the Human Eye", Journal of The Optical Society of America, vol. 36, No. 11, Nov. 1946, pp. 624-643, 20 pages total.
James A. Ferwerda et al., "A Model of Visual Adaptation for Realistic Image Synthesis", 1996, 10 pages total.
Rafal Mantiuk et al., "Lossy Compression of High Dynamic Range Images and Video", 2006, 10 pages total.
Hojatollah Yeganeh et al., "Objective Quality Assessment of Tone-Mapped Images", IEEE Transactions On Image Processing, vol. 22, No. 2, Feb. 2013, pp. 657-667, 11 pages total.
Hossein Ziaei Nafchi et al., "FSITM: A Feature Similarity Index For Tone-Mapped Images", IEEE Signal Processing Letters, vol. 22, No. 8, Aug. 2015, pp. 1026-1029, 4 pages total.
Ratal Mantiuk et al., "HDR-VDP-2: A calibrated visual metric for visibility and quality predictions in all luminance conditions", ACM Transactions on Graphics, vol. 30, No. 4, Article 40, Jul. 2011, pp. 1-13, 13 pages total.
Manish Narwaria et al., "HDR-VDP-2.2: A calibrated method for objective quality prediction of high dynamic range and standard images", 2015, pp. 1-10, 10 pages total.
International Search Report dated Jun. 10, 2019 issued by the International Searching Authority in counterpart International Application No. PCT/KR2019/001589 (PCT/ISA/210).
International Written Opinion dated Jun. 10, 2019 issued by the International Searching Authority in counterpart International Application No. PCT/KR2019/001589 (PCT/ISA/237).

* cited by examiner

FIRST HVS RECOGNITION INFORMATION

SECOND HVS RECOGNITION INFORMATION

FIG. 12

$$D = \begin{bmatrix} 1 & -1 & 0 & \cdots & 0 \\ 0 & 0 & -1 & \cdots & 0 \\ 0 & 0 & 1 & \cdots & 0 \\ \vdots & \vdots & \vdots & \ddots & \vdots \\ 0 & 0 & 0 & \cdots & 1 \end{bmatrix}$$

ELECTRONIC DEVICE AND CONTROL METHOD THEREOF

CROSS-REFERENCE TO RELATED APPLICATIONS

This application is a National Stage of International Application No. PCT/KR2019/001589, filed Feb. 8, 2019, claiming priority based on Korean Patent Application No. 10-2018-0110539, filed Sep. 14, 2018, the contents of all of which are incorporated herein by reference in their entirety.

TECHNICAL FIELD

This disclosure relates to an electronic device and a control method thereof, and more particularly, an electronic device for outputting an input image by adjusting a gradation and luminance of the input image and a control method thereof.

BACKGROUND ART

Various types of electronic devices have been developed and distributed along with development of electronic technologies. Particularly, a mobile device or a display device such as a TV most commonly used has been rapidly developed in recent years.

Recently, electronic devices capable of performing output with high luminance and high light intensity of 1,000 nits or more have been developed and distributed, and such electronic devices may minimize distortion of an image and output the image in a wide dynamic range.

An electronic device with limited high-luminance output of the related art outputted an image by reducing luminance without considering a feature of the image and a recognition response of human visual system (HVS). Accordingly, the width of the dynamic range of the output image was reduced and distortion or the like of the image according to the human visual system occurred.

There was a demand for a model for adjusting a gradation or luminance of an input image by considering a feature of an image and a recognition response of the human visual system, for the electronic device with the limited high-luminance output.

DISCLOSURE

Technical Problem

The disclosure is made in view of the above needs and an object of the disclosure is to provide an electronic device for adjusting a gradation or luminance of an image by considering a recognition response of a human visual system, a feature of an image, and the like, and a control method thereof.

Technical Solution

In accordance with an aspect of the disclosure, there is provided an electronic device including a storage configured to store first human visual system (HVS) recognition information according to a difference in luminance between adjacent pixels based on first maximum output luminance and second HVS recognition information according to a difference in luminance between adjacent pixels based on second maximum output luminance, and a processor configured to, obtain a first histogram regarding a difference in gradation between adjacent pixels of an input image based on the first maximum output luminance, obtain a second histogram regarding a difference in gradation between adjacent pixels of the input image based on the second maximum output luminance, obtain a third histogram regarding a difference in luminance between adjacent pixels of the input image based on the first HVS recognition information, obtain a fourth histogram regarding a difference in luminance between adjacent pixels of the input image based on the second HVS recognition information, and obtain a luminance value regarding the input image corresponding to the second maximum output luminance based on a difference between a first value obtained based on the first and third histogram information and a second value obtained based on the second and fourth histograms.

The processor may be configured to obtain a guide image by applying a guide tone mapping curve according to the second maximum output luminance to the input image, obtain a fifth histogram regarding a difference in gradation between adjacent pixels of the guide image, and obtain a luminance value regarding the input image corresponding to the second maximum output luminance based on the difference between the first value and the second value and a difference between the second and fifth histograms.

The processor may be configured to obtain a luminance value regarding the input image by applying a weight inversely proportional to a gradation value of each pixel of the input image to the difference between the second and fifth histograms.

The processor may be configured to obtain a plurality of second histograms regarding a difference in gradation between adjacent pixels of the input image based on the second maximum output luminance, obtain a plurality of fourth histograms corresponding to the plurality of second histograms based on the second HVS recognition information, obtain a plurality of second values based on a product between a plurality of elements included in each of the plurality of second histograms and a plurality of elements included in the corresponding fourth histogram, and select one of the plurality of second histograms based on a difference value between each of the plurality of second values and the first value, and obtain a luminance value regarding the input image based on a fourth histogram corresponding to the selected second histogram.

The processor may be configured to obtain a plurality of images by applying a plurality of tone mapping curves to the input image, and obtain the plurality of second histograms based on a difference in gradation between adjacent pixels included in the plurality of images, and identify a tone mapping curve corresponding to the selected second histogram among the plurality of tone mapping curves and obtain a luminance value regarding the input image by applying the identified tone mapping curve to the input image.

The storage may be configured to store mapping information regarding a gradation value of an image and a corresponding luminance value, and the processor may be configured to obtain a luminance value corresponding to a gradation value of each of a plurality of pixels included in the input image based on the mapping information, and obtain the third and fourth histograms based on the obtained luminance value.

the processor may be configured to obtain a plurality of scaled images by scaling the input image to different sizes, obtain a plurality of histograms regarding a difference in gradation between adjacent pixels of the plurality of scaled images based on the first maximum output luminance, and obtain the first histogram by applying different weights to the plurality of histograms and adding up the plurality of histograms to which the weights are applied.

The processor may be configured to obtain a sixth histogram by applying a weight matrix to the second histogram, and obtain a luminance value regarding the input image corresponding to the second maximum output luminance based on the difference between the first value and the second value, the difference between the second and fifth histograms, and the sixth histogram, and the weigh matrix may be a diagonal matrix for applying 1 to elements in a diagonal direction.

The processor may be configured to obtain a luminance value regarding the input image based on the following mathematic expression.

$$\underset{H_{500}}{\text{minimize}} \; \alpha \|H_{1k} \odot R_{1k}^{HVS} - H_{500} \odot R_{500}^{HVS}\|_F^2 +$$
$$(1-\alpha)\|W \odot (H_{500} - H_g)\|_F^2 + \beta\|H_{500}D\|_F^2$$

Herein, $H_{1k}$ represents a first histogram, $H_{500}$ represents a second histogram, $R_{1k}^{HVS}$ represents a third histogram, $R_{500}^{HVS}$ represents a fourth histogram, $H_g$ represents a fifth histogram, $H_{500}D$ represents a sixth histogram, $H_{1k} \odot R_{1k}^{HVS}$ represents a first value, $H_{500} \odot R_{500}^{HVS}$ represents a second value, D represents a weight matrix, α represents a first weight, and β represents a second weight.

In another aspect of the disclosure, there is provided a method for controlling an electronic device storing first human visual system (HVS) recognition information according to a difference in luminance between adjacent pixels based on first maximum output luminance and second HVS recognition information according to a difference in luminance between adjacent pixels based on second maximum output luminance, the method including obtaining a first histogram regarding a difference in gradation between adjacent pixels of an input image based on the first maximum output luminance, obtaining a second histogram regarding a difference in gradation between adjacent pixels of the input image based on the second maximum output luminance, obtaining a third histogram regarding a difference in luminance between adjacent pixels of the input image based on the first HVS recognition information, obtaining a fourth histogram regarding a difference in luminance between adjacent pixels of the input image based on the second HVS recognition information, and obtaining a luminance value regarding the input image corresponding to the second maximum output luminance based on a difference between a first value obtained based on the first and third histogram information and a second value obtained based on the second and fourth histograms.

The control method may further include obtaining a guide image by applying a guide tone mapping curve according to the second maximum output luminance to the input image, and obtaining a fifth histogram regarding a difference in gradation between adjacent pixels of the guide image, and the obtaining the luminance value regarding the input image may include obtaining a luminance value regarding the input image corresponding to the second maximum output luminance based on the difference between the first value and the second value and a difference between the second and fifth histograms.

The obtaining the luminance value regarding the input image may include obtaining a luminance value regarding the input image by applying a weight inversely proportional to a gradation value of each pixel of the input image to the difference between the second and fifth histograms.

The obtaining the second histogram may include obtaining a plurality of second histograms regarding a difference in gradation between adjacent pixels of the input image based on the second maximum output luminance, and the obtaining the luminance value regarding the input image may include obtaining a plurality of second values based on a product between a plurality of elements included in each of the plurality of second histograms and a plurality of elements included in the corresponding fourth histogram, selecting one of the plurality of second histograms based on a difference value between each of the plurality of second values and the first value, and obtaining a luminance value regarding the input image based on a fourth histogram corresponding to the selected second histogram.

The obtaining the second histogram may include obtaining a plurality of images by applying a plurality of tone mapping curves to the input image, and obtaining the plurality of second histograms based on a difference in gradation between adjacent pixels included in the plurality of images, and the obtaining the luminance value regarding the input image may include identifying a tone mapping curve corresponding to the selected second histogram among the plurality of tone mapping curves, and obtaining a luminance value regarding the input image by applying the identified tone mapping curve to the input image.

The obtaining the third histogram may include obtaining a luminance value corresponding to a gradation value of each of a plurality of pixels included in the input image based on mapping information regarding a gradation value of an image stored in the electronic device and a corresponding luminance value, and obtaining the third histogram based on the first HVS recognition information and the obtained luminance value, and the obtaining the fourth histogram may include obtaining a luminance value corresponding to a gradation value of each of the plurality of pixels included in the input image based on the mapping information, and obtaining the fourth histogram based on the second HVS recognition information and the obtained luminance value.

The obtaining the first histogram may include obtaining a plurality of scaled images by scaling the input image to different sizes, obtaining a plurality of histograms regarding a difference in gradation between adjacent pixels of the plurality of scaled images based on the first maximum output luminance, and obtaining the first histogram by applying different weights to the plurality of histograms and adding up the plurality of histograms to which the weights are applied.

The control method may further include obtaining a sixth histogram by applying a weight matrix to the second histogram, the obtaining the luminance value regarding the input image may include obtaining a luminance value regarding the input image corresponding to the second maximum output luminance based on the difference between the first value and the second value, the difference between the second and fifth histograms, and the sixth histogram, and the weigh matrix may be a diagonal matrix for applying 1 to elements in a diagonal direction.

The obtaining the luminance value regarding the input image may include obtaining a luminance value regarding the input image based on the following mathematic expression.

$$\underset{H_{500}}{\text{minimize}}\ \alpha\|H_{1k} \odot R_{1k}^{HVS} - H_{500} \odot R_{500}^{HVS}\|_F^2 +$$
$$(1-\alpha)\|W \odot (H_{500} - H_g)\|_F^2 + \beta\|H_{500}D\|_F^2$$

Herein, $H_{1k}$ represents a first histogram, $H_{500}$ represents a second histogram, $R_{1k}^{HVS}$ represents a third histogram, $R_{500}^{HVS}$ represents a fourth histogram, $H_g$ represents a fifth histogram, $H_{500}D$ represents a sixth histogram, $H_{1k} \odot R_{1k}^{HVS}$ represents a first value, $H_{500} \odot R_{500}^{HVS}$ represents a second value, D represents a weight matrix, $\alpha$ represents a first weight, and $\beta$ represents a second weight.

According to still another aspect of the disclosure, there is provided a non-transitory computer-readable recording medium storing a computer instruction for, when being executed by a processor of an electronic device, enabling the electronic device to perform an operation, the operation including obtaining a first histogram regarding a difference in gradation between adjacent pixels of an input image based on the first maximum output luminance, obtaining a second histogram regarding a difference in gradation between adjacent pixels of the input image based on the second maximum output luminance, obtaining a third histogram regarding a difference in luminance between adjacent pixels of the input image based on first human visual system (HVS) recognition information according to a difference in luminance between adjacent pixels based on the first maximum output luminance, obtaining a fourth histogram regarding a difference in luminance between adjacent pixels of the input image based on second HVS recognition information according to a difference in luminance between adjacent pixels based on the second maximum output luminance, and obtaining a luminance value regarding the input image corresponding to the second maximum output luminance based on a difference between a first value obtained based on the first and third histogram information and a second value obtained based on the second and fourth histograms.

Effect of Invention

According to the various embodiments of the disclosure, an electronic device for minimizing a difference in visual sense, a degree of distortion, and the like regarding an output image, compared to an input image, by adjusting a gradation or luminance of an image by considering a recognition response of a human visual system, a feature of an image, and the like and a control method thereof.

DESCRIPTION OF DRAWINGS

FIG. 12 is a diagram illustrating a weight matrix according to an embodiment.

DETAILED DESCRIPTION OF EXEMPLARY EMBODIMENTS

Figure 1:
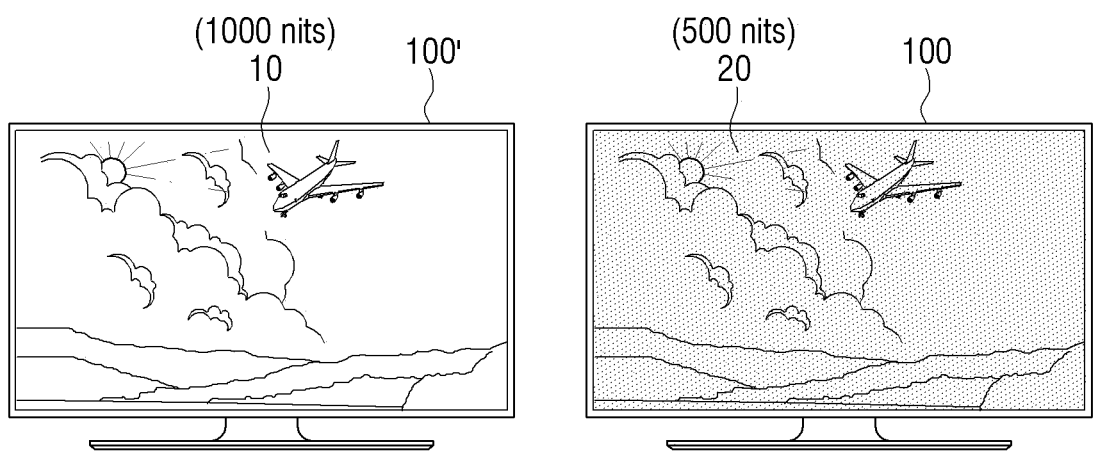
FIG. 1 is a diagram illustrating an electronic device according to an embodiment.

The disclosure will be described in greater detail below after briefly explaining the terms used in the disclosure.

The terms used in embodiments of the disclosure have been selected as widely used general terms as possible in consideration of functions in the disclosure, but these may vary in accordance with the intention of those skilled in the art, the precedent, the emergence of new technologies and the like. In addition, in a certain case, there may also be an arbitrarily selected term, in which case the meaning will be described in the description of the disclosure. Therefore, the terms used in the disclosure should be defined based on the meanings of the terms themselves and the contents throughout the disclosure, rather than the simple names of the terms.

The embodiments of the disclosure may be variously changed and include various embodiments, and specific embodiments will be shown in the drawings and described in detail in the description. However, it should be understood that this is not to limit the scope of the specific embodiments and all modifications, equivalents, and/or alternatives included in the disclosed spirit and technical scope are included. In describing the disclosure, a detailed description of the related art may be omitted when it is determined that the detailed description may unnecessarily obscure a gist of the disclosure.

The terms "first," "second," or the like may be used for describing various elements but the elements may not be limited by the terms. The terms are used only to distinguish one element from another.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

A term such as "module" or a "unit" in the disclosure may perform at least one function or operation, and may be implemented as hardware, software, or a combination of hardware and software. Further, except for when each of a plurality of "modules", "units", and the like needs to be realized in an individual hardware, the components may be integrated in at least one module and be implemented in at least one processor (not illustrated).

Hereinafter, with reference to the accompanying drawings, embodiments of the disclosure will be described in detail. But, the disclosure may be implemented in various different forms and is not limited to the embodiments described herein. In addition, in the drawings, the parts not relating to the description are omitted for clearly describing the disclosure, and the same reference numerals are used for the same parts throughout the specification.

FIG. 1 is a diagram illustrating an electronic device according to an embodiment.

Referring to FIG. 1, an electronic device 100 may be implemented as a display device (e.g., TV). However, the electronic device 100 is not limited thereto and may be implemented as various types of electronic devices performing image processing. For example, the electronic device 100 may be implemented as various types of source devices for providing a content to an external device provided with a display such as a Blu-ray player, a digital versatile disc (DVD) player, a streaming content output device, a set-top box, and the like. The electronic device 100 may output an image autonomously by performing image processing according to various embodiments of the disclosure and provide an image to an external device provided with a display.

The electronic device 100 may be implemented as a device with a display function such as a TV, a smartphone, a tablet PC, a PMP, a PDA, a laptop PC, a smart watch, a head mounted display (HMD), a near eye display (NED), and the like. The electronic device 100 may be implemented to include various types of displays such as a liquid crystal display (LCD), an organic light-emitting diode (OLED), a liquid crystal on silicon (LCoS), a digital light processing (DLP), a micro LED, a quantum dot (QD), and the like to provide a display function. Hereinafter, for convenience of description, the description will be made by assuming that the electronic device 100 is implemented as a display device.

The electronic device 100 may output an image within an outputable luminance of a display provided in the electronic device 100. For example, the electronic device 100 may output an image with luminance of 200 to 700 nits. However, there is no limitation thereto and the electronic device 100 may output an image with luminance of 500 nits or 1,000 nits maximally according to the display provided in the electronic device 100. For example, when a maximum outputable luminance of the display provided in the electronic device 100 is 1,000 nits, the electronic device 100 may identify a luminance value of 0 to 1,000 nits corresponding to a pixel value of an input image and output the input image with the identified luminance value. In another example, when the maximum outputable luminance of the display provided in the electronic device 100 is 500 nits, the electronic device 100 may identify a luminance value of 0 to 500 nits corresponding to the pixel value of the input image and output the input image with the identified luminance value.

When the maximum outputable luminance of the display provided in the electronic device 100 is 1,000 nits, luminance of an output image may be 0 to 1,000 nits, and when the maximum outputable luminance of the display provided in the electronic device 100 is 500 nits, luminance of an output image may be 0 to 500 nits.

Referring to FIG. 1, when a maximum outputable luminance of an electronic device 100' is 1,000 nits, luminance of a first output image 10 may be 0 to 1,000 nits. Meanwhile, when the maximum outputable luminance of the electronic device 100 is 500 nits, luminance of a second output image 20 may be 0 to 500 nits. Although the input image is the same, luminance of first and second output images 10 and 20 may be in ranges different from each other according to the maximum outputable luminance of the electronic device 100. The second output image 20 may be provided to be relatively darker than the first output image 10. In addition, the second output image 20 may have a width of a dynamic range narrower than that of the first output image 10.

In the related art, an input image was output by considering only the maximum outputable luminance of the electronic device, without considering recognition information of a human visible system (HVS), a feature of an image, and the like. In an example, the electronic device applied a pre-stored static tone mapping curve to the input image to adjust the luminance of the output image within the maximum outputable luminance of the electronic device.

The electronic device 100 according to the various embodiments of the disclosure may perform the image processing with respect to the input image by considering the recognition information according to the HVS, the feature of the image, and the like, in addition to the maximum outputable luminance of the electronic device 100. In addition, the electronic device 100 may apply a dynamic tone mapping curve that is not static, to the input image to adjust the luminance of the output image.

According to the various embodiments of the disclosure, sense of difference, a difference, a degree of deterioration, a degree of distortion, and the like according to human visual system (HVS) between the first output image 10 when outputting the input image by the electronic device 100' having the maximum outputable luminance of 1,000 nits and the second output image 20 when outputting the input image by the electronic device 100 having the maximum outputable luminance of 500 nits may be minimized. The human visual system (HVS), human visual system recognition information, and the like will be described later in detail.

Meanwhile, the luminance values such as 1,000 nits, 500 nits, and the like mentioned as the maximum outputable luminance of the electronic device 100 are merely examples and there is no limitation thereto. For example, a monitor may output with maximum luminance of 400 nits, a smartphone may output maximum luminance of 700 nits, and a digital signage may output maximum luminance of 2,000 nits. The maximum outputable luminance of the electronic device 100 is not limited thereto and may be variously set. For example, the electronic device 100 may output an image with luminance of 1,000 nits or more and 0.05 nits or less. Hereinafter, for convenience of description, the description will be made by assuming that the maximum outputable luminance of the electronic device 100 is 500 nits.

Figure 2:
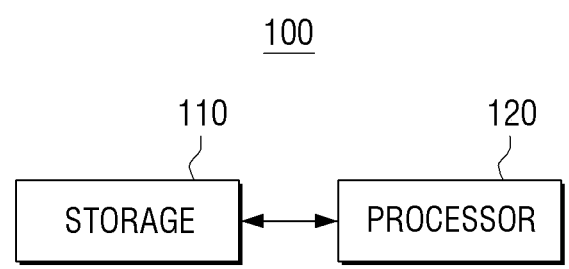
FIG. 2 is a block diagram illustrating a configuration of an electronic device according to an embodiment.

FIG. 2 is a block diagram illustrating a configuration of an electronic device according to an embodiment.

Referring to FIG. 2, the electronic device 100 may include a storage 110 and a processor 120.

The storage 110 may store an operating system (O/S) for operating the electronic device 100, software modules, and various pieces of data such as various multimedia contents.

The storage 110 may be implemented as an internal memory such as a ROM (e.g., electrically erasable programmable read-only memory (EEPROM)) or a RAM included in the processor 120 or may be implemented as a memory separated from the processor 120. In this case, the storage 110 may be implemented in a form of a memory embedded in the electronic device 100 according to the data storage purpose or may be implemented in a form of a memory detachable from the electronic device 100. For example, data for operating the electronic device 100 may be stored in a memory embedded in the electronic device 100, and data for an extended function of the electronic device 100 may be stored in a memory detachable from the electronic device 100. Meanwhile, the memory embedded in the electronic device 100 may be implemented in a form of a flash memory, a non-volatile memory, a volatile memory, a hard disk drive (HDD), or a solid state drive (SSD), and the memory detachable from the electronic device 100 may be implemented as a memory card (e.g., micro SD card or USB memory) or external memory connectable to the USB port (e.g., USB memory).

Particularly, the storage 110 according to an embodiment of the disclosure may store human visual system (hereinafter, HVS) recognition information according to a luminance value based on a just-noticeable difference (hereinafter, JND) concept. Herein, the JND may be a concept referring to a minimum difference to notice a difference between two stimulations. In an example, the HVS recognition information according to the luminance value may be information obtained by digitizing the fact whether a difference between first and second luminance causes stimulation for the optic nerve of a person by a threshold value or more, a stimulation change amount for the optic nerve of a person corresponding to the difference between the first and second luminance, and the like.

The storage 110 according to an embodiment may store the HVS recognition information according to a difference in luminance between adjacent pixels based on specific luminance. Herein, the HVS recognition information according to a difference in luminance between adjacent pixels may be information obtained by digitizing a recognition stimulation amount (or response amount or reaction amount) of the optic nerve of a person corresponding to a difference between luminance of a pixel and luminance of a pixel adjacent to the corresponding pixel. For example, when the luminance of the pixel is 100 nits and the luminance of the pixel adjacent to the corresponding pixel is 500 nits, a stimulation change amount of the optic nerve of a person corresponding to a difference between 100 nits and 500 nits may be digitized and included in the HVS recognition information.

The storage 110 may store first HVS recognition information according to a difference in luminance between adjacent pixels based on a first maximum output luminance and second HVS recognition information according to a difference in luminance between adjacent pixels based on a second maximum output luminance. In an example, the first maximum output luminance may be 1,000 nits and the second maximum output luminance may be 500 nits.

The storage 110 may store HVS recognition information according to a difference in luminance between adjacent pixels based on 1,000 nits and HVS recognition information according to a difference in luminance between adjacent pixels based on 500 nits. Herein, 1,000 nits and 500 nits are merely examples and there is no limitation thereto. For example, the storage 110 may store HVS recognition information based on 2,000 nits and HVS recognition information based on 1,000 nits.

According to an embodiment, the HVS recognition information according to the luminance value may be stored in the storage 110 in advance. However, there is no limitation thereto and the electronic device 100 may receive the HVS recognition information from a server (not illustrated) and store the HVS recognition information in the storage 110. In addition, the HVS recognition information pre-stored in the storage 110 may also be updated.

The storage 110 according to an embodiment of the disclosure may store mapping information regarding a gradation value of an image and a corresponding luminance value in advance. For example, an input image of 8 bits may have a gradation value of 0 to 255. When outputting the input image, the electronic device 100 may identify a luminance value corresponding to the gradation value of the input image based on the mapping information, and output the input image with the identified luminance value. In an example, the electronic device 100 may output a pixel having a gradation value of 255 among a plurality of pixels of the input image with luminance of 500 nits based on the mapping information.

In another example, an input image of 10 bits may have a gradation value of 0 to 1023. When outputting the input image of 10 bits, the electronic device 100 may identify a luminance value corresponding to a gradation value of the input image based on the mapping information, and output the input image with the identified luminance value. In an example, the electronic device 100 may output a pixel having a gradation value of 1023 among the plurality of pixels of the input image with luminance of 500 nits based on the mapping information. The mapping information will be described below in detail with reference to FIG. 5.

Meanwhile, the gradation value of each of the plurality of pixels included in the input image may be expressed as a pixel value, a brightness value, a brightness code, and the like, but hereinafter, these are collectively referred to as the gradation value, for convenience of description.

The processor 120 may be implemented as a digital signal processor (DSP), a microprocessor, or a time controller (TCON) for processing digital signals. However, there is no limitation thereto, and the processor 120 may include one or more of a central processing unit (CPU), a microcontroller unit (MCU), a microprocessing unit (MPU), a controller, an application processor (AP), or a communication processor (CP), and an ARM processor or may be defined as the corresponding term. In addition, the processor 120 may be implemented as System on Chip (SoC) or large scale integration (LSI) including the processing algorithm or may be implemented in form of a field programmable gate array (FPGA).

In particular, the processor 120 according to an embodiment of the disclosure may obtain a first histogram regarding a difference in gradation between adjacent pixels of an input image based on a first maximum output luminance. Hereinafter, for convenience of description, the first maximum output luminance is assumed as 1,000 nits.

According to an embodiment, the input image may be an image based on 1,000 nits. For example, the gradation values of the input image may be mapped with luminance values of 0 to 1,000 nits. When the maximum outputable luminance of the electronic device 100 is 1,000 nits, the input image may be output with the luminance of 0 to 1,000 nits. The output image may have a dynamic range having a width of 0 to 1,000 nits.

According to an embodiment, the processor 120 may obtain the first histogram regarding a difference in gradation between a pixel of the input image and a pixel adjacent to the corresponding pixel. Herein, the first histogram may be a 2D histogram. An X axis of the 2D histogram may indicate a gradation value of a pixel and a Y axis may indicate a gradation value of a pixel adjacent to the corresponding pixel.

In an example, when a resolution of the input image is 3840×2160, the processor 120 may obtain a difference in gradation between a pixel positioned at (x, y) of the input image and a pixel positioned at (x+1, y) adjacent to the corresponding pixel. The processor 120 may obtain the first histogram based on a difference in gradation between 8,294,400 pixels and pixels adjacent thereto, respectively in the input image.

In another example, the processor 120 may obtain a difference in gradation between a pixel positioned at (x, y) of the input image and a pixel positioned at (x, y+1) adjacent to the corresponding pixel, and obtain the first histogram based on the difference in gradation.

The processor 120 according to an embodiment of the disclosure may obtain a second histogram regarding a difference in gradation between adjacent pixels of the input image based on a second maximum output luminance. According to an embodiment, a maximum outputable luminance of the electronic device 100 may be the second maximum output luminance. For example, the maximum outputable luminance and the second maximum output luminance of the electronic device 100 may be 500 nits. The processor 120 may obtain an image for outputting the input image within 500 nits that is the maximum outputable luminance of the electronic device 100. Hereinafter, for convenience of description, the image obtained for outputting the input image within 500 nits that is the maximum outputable luminance of the electronic device 100 and the input image corresponding to the second maximum output luminance may be collectively referred to as an image based on 500 nits.

In an example, the processor 120 may obtain a difference in gradation between a pixel positioned at (x, y) of an image based on 500 nits and a pixel positioned at (x+1, y) adjacent to the corresponding pixel. For example, when the resolution of the input image is 3840×2160, the processor 120 may obtain the second histogram based on a difference in gradation between 8,294,400 pixels and pixels adjacent thereto, respectively, in the image based on the 500 nits.

In another example, the processor 120 may obtain a difference in gradation between a pixel positioned at (x, y) of the image based on 500 nits and a pixel positioned at (x, y+1) adjacent to the corresponding pixel and obtain the second histogram based on the difference in gradation.

The processor 120 according to an embodiment of the disclosure may obtain a third histogram regarding a difference in luminance between adjacent pixels of the input image based on the first HVS recognition information.

The processor 120 according to an embodiment may obtain a difference in luminance between a pixel positioned at (x, y) of the input image and a pixel positioned at (x+1, y) adjacent to the corresponding pixel based on the first HVS recognition information based on 1,000 nits stored in the storage 110. Then, the processor 120 may obtain the third histogram based on a difference in luminance between a plurality of pixels and pixels adjacent thereto, respectively, in the input image.

In another example, the processor 120 may obtain the third histogram based on a difference in luminance between a pixel positioned at (x, y) of the input image and a pixel positioned at (x, y+1) adjacent to the corresponding pixel.

The processor 120 according to an embodiment of the disclosure may obtain a fourth histogram regarding a difference in luminance between adjacent pixels of the input image based on the second HVS recognition information.

The processor 120 according to an embodiment may obtain a difference in luminance between a pixel positioned at (x, y) of the image based on 500 nits and a pixel positioned at (x+1, y) adjacent to the corresponding pixel, based on the second HVS recognition information based on 500 nits stored in the storage 110. Then, the processor 120 may obtain the fourth histogram based on a difference in luminance between a plurality of pixels and pixels adjacent thereto, respectively, in the image based on 500 nits.

In another example, the processor 120 may obtain the fourth histogram based on a difference in luminance between a pixel positioned at (x, y) of the image based on 500 nits and a pixel positioned at (x, y+1) adjacent to the corresponding pixel.

The processor 120 according to an embodiment may obtain a first value based on the first and third histogram information and obtain a second value based on the second and fourth histogram. Then, the processor 120 may obtain a luminance value regarding the input image corresponding to the second maximum output luminance based on a difference between the first value and the second value. For example, the processor 120 may obtain a luminance value regarding the input image corresponding to the second maximum output luminance based on the following Mathematic Expression 1.

$$\|H_{1k} \odot R_{1k}^{HVS} - H_{500} \odot R_{500}^{HVS}\|_F^2 \qquad \text{[Mathematic Expression 1]}$$

Herein, $H_{1k}$ represents a first histogram, $H_{500}$ represents a second histogram, $R_{1k}^{HVS}$ represents a third histogram, $R_{500}^{HVS}$ represents a fourth histogram, $H_{1k} \odot R_{1k}^{HVS}$ represents a first value, $H_{500} \odot R_{500}^{HVS}$ represents a second value, and $\odot$ represents multiplication between elements.

The processor 120 according to an embodiment of the disclosure may obtain a plurality of second histograms regarding a difference in gradation between adjacent pixels of the input image based on the second maximum output luminance.

In an example, the processor 120 may obtain a plurality of images by applying a plurality of tone mapping curves (TMC) to the input image and obtain the plurality of second histograms based on a difference in gradation between adjacent pixels included in the plurality of images. Herein, each of the plurality of images may be an image based on 500 nits.

Meanwhile, the processor 120 according to an embodiment of the disclosure may obtain a plurality of images by applying the plurality of tone mapping curves to the input image. Herein, the tone mapping curve may be a curve for adjusting a gradation value of each pixel included in the input image to another gradation. In another example, the tone mapping curve may be a curve for adjusting a luminance value of each pixel included in the input image to another luminance. However, there is no limitation thereto, and various types of mathematic expressions and graphs for adjusting a gradation of a pixel in the input image to another gradation may be used as a gradation adjusting curve.

The processor 120 according to an embodiment of the disclosure may obtain a plurality of fourth histograms corresponding to the plurality of second histograms based on the second HVS recognition information. In an example, the processor 120 may obtain the second and the fourth histograms corresponding to the image based on 500 nits. Then, the processor 120 may obtain the second value based on a product between a plurality of elements included in each of the second histogram and the fourth histogram.

The processor 120 may obtain a plurality of second values based on product of a plurality of elements included in each of the plurality of second histograms and a plurality of elements included in the corresponding fourth histogram. Then, the processor 120 may select one of the plurality of second histograms based on a difference value between each of the plurality of second value and the first value.

[Mathematical Expression 2]

$$\underset{H_{500}}{\text{minimize}} \, \alpha \| H_{1k} \odot R_{1k}^{HVS} - H_{500} \odot R_{500}^{HVS} \|_F^2$$

$H_{1k}$ represents a first histogram, $H_{500}$ represents a second histogram, $R_{1k}^{HVS}$ represents a third histogram, $R_{500}^{HVS}$ represents a fourth histogram, $H_{1k} \odot R_{1k}^{HVS}$ represents a first value, $H_{500} \odot R_{500}^{HVS}$ represents a second value, and $\odot$ represents multiplication between elements.

For example, the processor 120 may identify the second and fourth histograms in which the difference value between each of the plurality of second values and the first value is a minimum value. In another example, the processor 120 may select the second histogram for minimizing the difference value between each of the plurality of second values and the first value among the plurality of second histograms.

Then, the processor 120 may obtain a luminance value regarding the input image based on the fourth histogram corresponding to the selected second histogram. For example, the processor 120 may identify a tone mapping curve corresponding to the selected second histogram among the plurality of tone mapping curves applied to the input image and obtain a luminance value regarding the input image by applying the identified tone mapping curve to the input image. In an example, the processor 120 may obtain an image based on 500 nits by applying the identified tone mapping curve to the input image and output the obtained image.

According to an embodiment, the processor 120 may output an image with minimum sense of difference, difference, degree of deterioration, and degree of distortion according to the HVS with respect to the input image based on 1,000 nits among the plurality of images based on 500 nits. For example, the processor 120 may identify an image for minimizing a difference between the first value and the second value among the plurality of images based on Mathematic Expression 2 and output the identified image.

In another example, the processor 120 may identify a tone mapping curve for minimizing a difference between the first value and the second value among the plurality of tone mapping curves based on Mathematic Expression 2 and adjust the luminance of the input image by applying the identified tone mapping curve to the input image, and output the input image.

Figure 3:
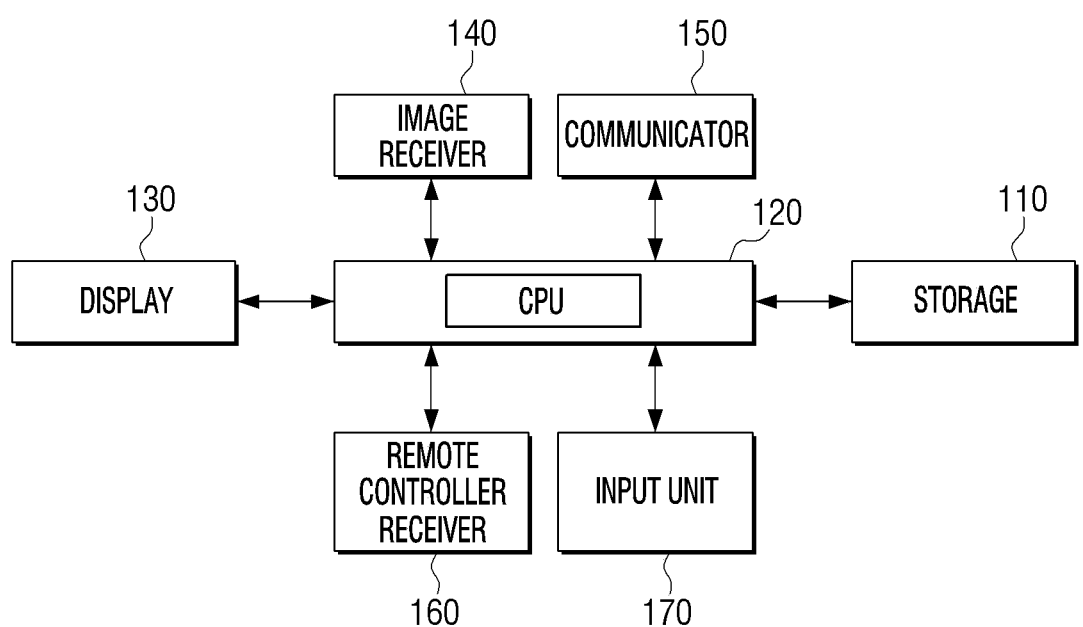
FIG. 3 is a block diagram illustrating a specific configuration of the electronic device illustrated in FIG. 2.

FIG. 3 is a block diagram illustrating a specific configuration of the electronic device illustrated in FIG. 2.

Referring to FIG. 3, the electronic device 100 may include the storage 110, the processor 120, a display 130, an image receiver 140, a communicator 150, a remote controller receiver 160, and an input unit 170. The detailed description of the configuration illustrated in FIG. 3 that is overlapped with the configuration illustrated in FIG. 2 will not be repeated.

The processor 120 may control general operations of the electronic device 100 using various programs stored in the storage 110.

The processor 120 may include a RAM, a ROM, a graphics processor, a main CPU, first to n-th interfaces, and a bus. The RAM, the ROM, the graphics processor, the main CPU, and the first to n-th interfaces may be connected to each other via the bus.

The ROM may store a set of instructions for system booting. If a turn-on instruction is input to supply power, the main CPU copies the O/S stored in the storage 110 to the RAM and boots the system up by executing the O/S according to the instruction stored in the ROM. When the booting is completed, the main CPU copies various application programs stored in the storage 110 to the RAM and executes various operations by executing the application programs copied to the RAM.

The graphics processor generates a screen including various objects such as icons, images, texts, and the like by using an operating unit and a rendering unit. The operating unit may calculate attribute values such as a coordinate value of each object to be displayed, a shape, a size, a color and the like thereof according to the layout of the screen by using the control command received from the communicator 150.

The main CPU may execute the booting using the O/S stored in the storage 110 by accessing the storage 110. The main CPU may execute various operations using various programs, contents, data, and the like stored in the storage 110.

The first to n-th interfaces may be connected to the various elements described above. One of the interfaces may be a network interface connected to an external device via a network.

The display 130 may provide various content screens that may be provided by the electronic device 100. Herein, the content screen may include various contents such as an image, a video, a text, a music, and the like, an application execution screen including the various contents, and a graphics user interface (GUI) screen, and the like.

Meanwhile, as described above, the display 130 may be implemented as various types of displays such as a liquid crystal display, an organic light-emitting diode, a liquid crystal on silicon (LCoS), a digital light processing (DLP), and the like. In addition, the display 130 may be formed of a transparent material to be implemented as a transparent display for displaying information.

Meanwhile, the display 130 may be implemented in a form of a touch screen having a layer structure with a touch pad, and in this case, the display 130 may be used as a user interface, in addition to an output device.

Meanwhile, the display 130 according to an embodiment of the disclosure may have a maximum luminance that is outputable according to the control of the processor 120, the performance of the display 130, and the like. For example, the display 130 may output the maximum luminance of 500 nits. In another example, the display 130 may output the maximum luminance of 1,000 nits. In the disclosure, for convenience of description, the first maximum output luminance is assumed as 1,000 nits, the second maximum output luminance is assumed as 500 nits, and a case where the maximum luminance outputable by the electronic device 100 is 500 nits is assumed. However, these are merely examples and there is no limitation thereto. For example, although the maximum luminance outputable by the electronic device 100 is 1,000 nits, the electronic device 100 may adjust the luminance to 0 to 500 nits and output the input image under the control of the processor 120. The processor 120 may adjust the gradation, the luminance, and the like of each pixel of the image and output the image according to the various embodiments of the disclosure, regardless of the maximum luminance outputable by the electronic device 100 according to the performance or the like of the display 130.

The image receiver 140 may be implemented as a tuner for receiving a broadcasting image, but is not limited thereto, and may be implemented as various types of communication modules for receiving various external images such as a Wi-Fi module, a USB module, an HDMI module, and the like. In addition, the image may be stored in the storage 110, and in this case, the electronic device 100 may adjust the gradation and output luminance of each pixel of the image stored in the storage 110 according to the various embodiments of the disclosure and output the image.

The communicator 150 may transmit/receive an image. For example, the communicator 150 may receive an acoustic signal from an external device (e.g., source device), an external storage medium (e.g., USB), an external server (e.g., hard drive on the web), and the like by a streaming or downloading method via communication methods such as AP-based Wi-Fi (wireless LAN network), Bluetooth, Zigbee, wired/wireless local area network (LAN), WAN, Ethernet, IEEE 1394, HDMI, USB, MHL, AES/EBU, Optical, Coaxial, and the like.

In addition, the communicator 150 may receive the first and second HVS recognition information and the mapping information regarding the gradation value of the image and the corresponding luminance value from an external server (not illustrated). In an example, the electronic device 100 may receive the information from the external server and store the information in the storage 110, and update pre-stored information based on the information received from the external server. In addition, the electronic device 100 may obtain a weight, a weight matrix, and the like used for selecting any one of the plurality of second histograms from the server. In another example, the electronic device 100 may obtain a weight, a weight matrix, and the like used for selecting any one of the plurality of tone mapping curves from the server.

The remote controller signal receiver 160 may be an element for receiving a remote controller signal transmitted from a remote controller. The remote controller signal receiver 160 may be implemented by including a light receiver for receiving an infrared (IR) signal, or may be implemented in a form of receiving a remote controller signal by communicating with the remote controller according to wireless communication protocol such as Bluetooth or Wi-Fi.

The input unit 170 may be implemented as various buttons provided on a main body of the electronic device 100. The user may input various user commands such as a turning on/turning off command, a channel change command, a volume adjusting command, a menu confirming command, and the like via the input unit 180.

Figure 4:
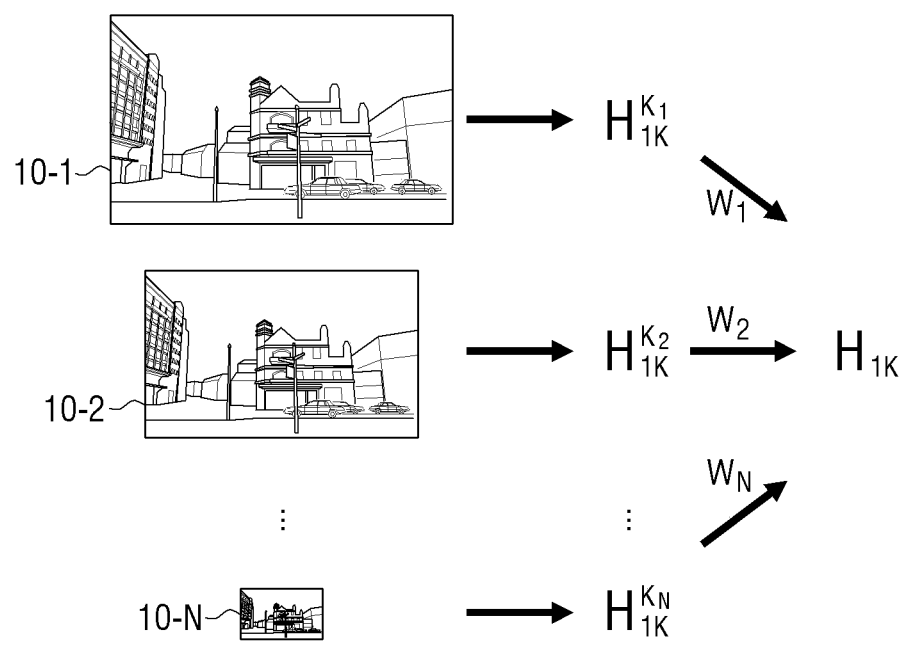
FIG. 4 is a diagram illustrating a first histogram according to an embodiment.

FIG. 4 is a diagram illustrating a first histogram according to an embodiment.

The electronic device 100 according to an embodiment of the disclosure may obtain a plurality of scaled images 10-1, . . . , and 10-N by scaling an input image to different sizes. In an example, the electronic device may obtain first to N-th scaled images 10-1, . . . , and 10-N by scaling the input image down in sequence.

Then, the electronic device 100 may obtain a plurality of histograms regarding a difference in gradation between adjacent pixels of the plurality of scaled images 10-1, . . . , and 10-N based on the first maximum output luminance. For example, the electronic device 100 may obtain a 2D histogram corresponding to each of the first to N-th scaled images 10-1, . . . , and 10-N.

For example, the electronic device 100 may scale the input image based on a first scale factor $K_1$ and obtain the first scaled image 10-1. Then, the electronic device 100 may obtain a 2D histogram $H_{1k}^{k_1}$ of the first scaled image 10-1.

In addition, the electronic device 100 may scale the input image based on a second scale factor $K_2$ and obtain the second scaled image 10-2. Then, the electronic device 100 may obtain a 2D histogram $H_{1k}^{k_2}$ of the second scaled image 10-2.

The electronic device 100 may scale the input image based on an N-th scale factor $K_N$ and obtain an N-th scaled image 10-N. Then, the electronic device 100 may obtain a 2D histogram $H_{1k}^{k_N}$ of the N-th scaled image 10-N.

The electronic device 100 according to an embodiment of the disclosure may apply different weights $\omega_1, \omega_2, \ldots, \omega_N$ to the plurality of histograms $H_{1k}^{k_1}, H_{1k}^{k_2}, \ldots, H_{1k}^{k_N}$ and add up the plurality of histograms $\omega_1 H_{1k}^{k_1}, \omega_2 H_{1k}^{k_2}, \ldots, \omega_N H_{1k}^{k_N}$, to which the weights are applied, to obtain a first histogram $H_{1k}$.

The electronic device 100 according to an embodiment may obtain the first histogram $H_{1k}$ based on the following Mathematic Expression 3.

$$H_{1k} = \omega_1 H_{1k}^{k_1} + \omega_2 H_{1k}^{k_2} + \ldots + \omega_N H_{1k}^{k_N}$$

Herein, $\omega_i$ represents a weight of an i-th scaled image and $H_{1k}^{k_i}$ represents a 2D histogram of the i-th scaled image 10-i obtained by applying an i-th scale factor $K_i$ to the input image.

The 2D histogram herein represents a frequency of a difference in gradation between two pixels adjacent to each other in the image. In an example, a 2D histogram of an image $X = \{x(i,j) | 1 \le i \le H, 1 \le j \le W\}$ may be represented by $H_x = \{h_x(m,n) | 1 \le m \le K, 1 \le n \le K\}$. An (m, n)-th element $h_x(m, n)$ on the 2D histogram may represent a frequency that a gradation value of a pixel in the image is m and a gradation value of a pixel adjacent to the corresponding pixel is n.

The electronic device 100 may obtain a first value based on the first histogram and the third history information. For example, the electronic device 100 may obtain the first value $H_{1k} \odot R_{1k}^{HVS}$ based on Mathematic Expression 1 or 2. Herein, $H_{1k}$ represents first histogram information and $R_{1k}^{HVS}$ represents third histogram information.

Figure 5:
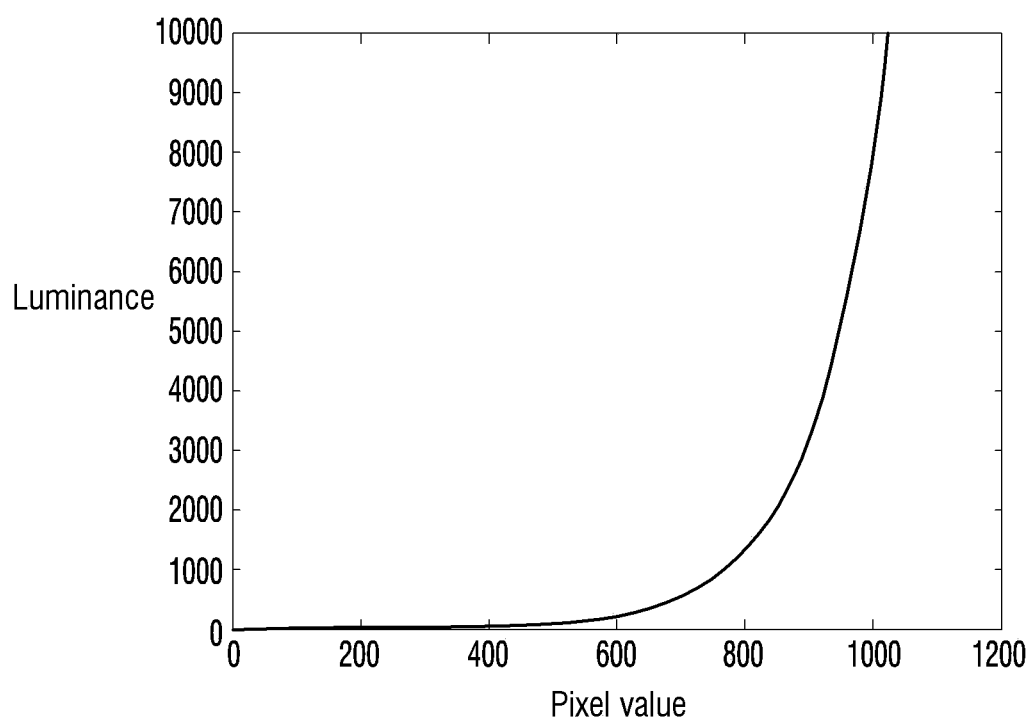
FIG. 5 is a graph illustrating mapping information regarding a gradation value and a luminance value according to an embodiment.

FIG. 5 is a graph illustrating mapping information regarding a gradation value and a luminance value according to an embodiment.

The electronic device 100 according to an embodiment of the disclosure may include mapping information regarding a gradation value of an image and a corresponding luminance value. When outputting the image, the electronic device 100 may identify a luminance value corresponding to a gradation value of each pixel of the image based on the mapping information. Then, the electronic device 100 may output the image according to the identified luminance value. The electronic device 100 may convert the gradation value into the luminance value based on the mapping information.

Referring to FIG. 5, the mapping information regarding the gradation value of the image and the corresponding luminance value may be referred to as an electro-optical transfer function (hereinafter, EOTF). For example, the electronic device 100 may include an EOTF according to ST. 2084 standard. However, there is no limitation thereto and the electronic device 100 may include various types of lookup tables (LUT), functions, graphs, and the like representing the gradation value and the luminance value corresponding to the corresponding gradation value. For example, the electronic device 100 may also include an EOTF according to BT. 1886 standard. In addition, the electronic device 100 may receive and store an EOTF according to new standard by updating or the like.

The electronic device 100 according to an embodiment of the disclosure may obtain a luminance value corresponding to a gradation value of each of the plurality of pixels included in the input image based on the mapping information. In an example, the electronic device 100 may obtain a luminance value of 0 to 1,000 nits.

In addition, the electronic device 100 according to an embodiment may identify the gradation value and the corresponding luminance value of each pixel of the image based on 500 nits obtained from the input image based on the mapping information. In an example, the electronic device 100 may obtain the luminance value of 0 to 500 nits.

Meanwhile, the electronic device 100 according to an embodiment of the disclosure may obtain a plurality of images by applying a plurality of tone mapping curves to the input image. Herein, each of the plurality of images may be an image based on 500 nits. Then, the electronic device 100 may obtain a luminance value of each of the plurality of images based on the mapping information. In an example, the electronic device 100 may identify the gradation value and the corresponding luminance value of each pixel of the first image among the plurality of images. In addition, the electronic device 100 may identify the gradation value and the corresponding luminance value of each pixel of the second image among the plurality of images.

The electronic device 100 according to an embodiment of the disclosure may identify the maximum output luminance based on an average picture level (hereinafter, APL) of the input image. Herein, the APL may be an average gradation value of the input image. As the APL is high, the image may be a relatively bright image, and as the APL is low, the image may be relatively dark image. In an example, the electronic device 100 may limit the maximum output luminance according to brightness of the input image in order to output the input image within maximum power consumption (or average power consumption). The electronic device 100 may limit the maximum output luminance according to the APL of the input image. In an example, the electronic device 100 may output the gradation value of 1023 levels in the input image as the luminance of 100 nits to 500 nits according to the APL of the input image.

The electronic device 100 may limit the luminance of each gradation value of the image having a high APL to be low compared to the luminance of each gradation value of the image having a comparatively lower APL, in order to output the image within the maximum power consumption (or average power consumption).

Figure 6:
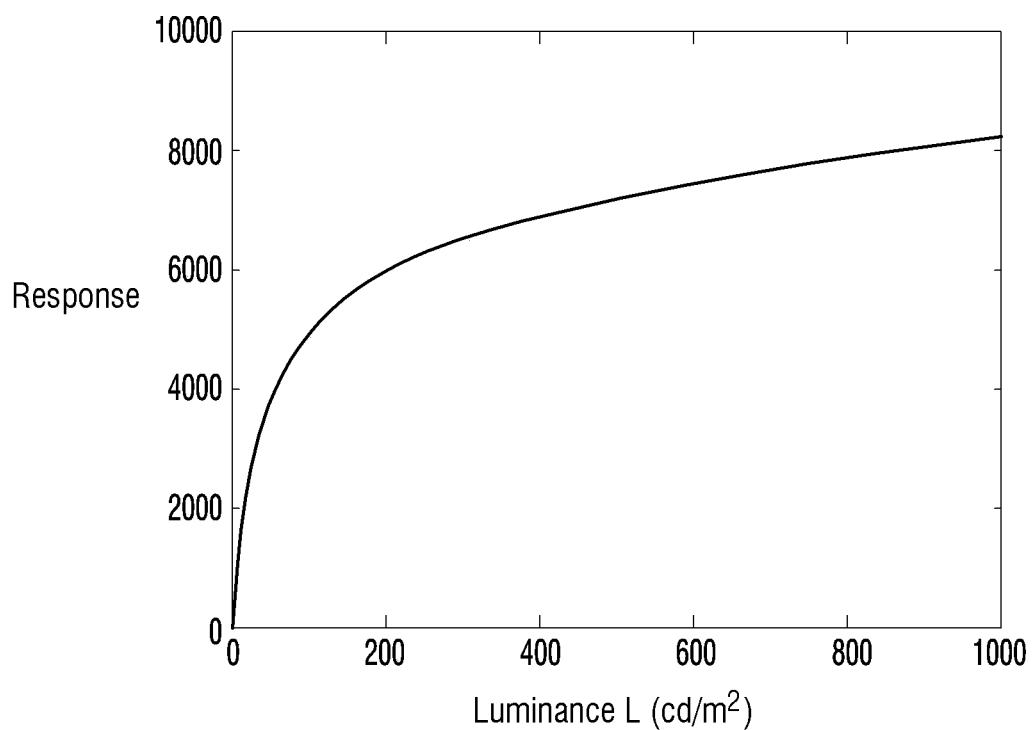
FIGS. 6 to 7 are diagrams illustrating human visual system (HVS) recognition information according to an embodiment.
Figure 7:
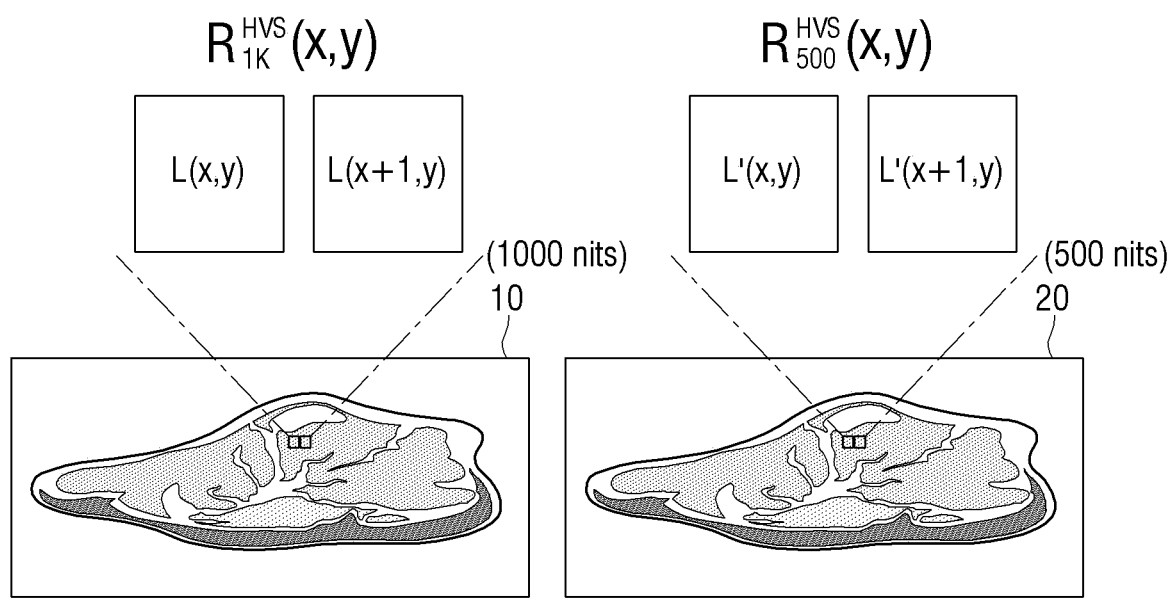

FIGS. 6 and 7 are diagrams illustrating human visual system (HVS) recognition information according to an embodiment.

The electronic device 100 according to an embodiment of the disclosure may store human visual system (hereinafter, HVS) recognition information according to the luminance value based on just-noticeable difference (hereinafter, JND) concept.

An X axis of a graph illustrated in FIG. 6 indicates a luminance value and a Y axis indicates a digitized value of recognition response (or recognition stimulation) of human visual system. The graph shows that the recognition response of the human visual system rapidly changes at low luminance of 0 nits to 200 nits and the recognition response of the human visual system gradually changes at high luminance of 200 nits to 1,000 nits. The graph shows that the optic nerve of a person is sensitive with comparatively low luminance.

Referring to FIG. 7, the electronic device 100 may obtain a luminance value $L(x, y)$ of a pixel positioned at $(x, y)$ of the input image 10 based on the mapping information (e.g., graph illustrated in FIG. 5). Then, the electronic device 100 may obtain a luminance value $L(x+1, y)$ of a pixel positioned at $(x+1, y)$ adjacent to the corresponding pixel. The electronic device 100 may obtain an HVS recognition response amount $R_{1k}^{HVS}$ according to a difference in luminance between the adjacent pixels based on the HVS recognition information (e.g., graph illustrated in FIG. 6).

Meanwhile, the electronic device 100 may obtain a luminance value $L'(x, y)$ of a pixel positioned at $(x, y)$ of an image based on 500 nits based on the mapping information. Then, the electronic device 100 may obtain a luminance value $L'(x+1, y)$ of a pixel positioned at $(x+1, y)$ adjacent to the corresponding pixel. The electronic device 100 may obtain an HVS recognition response amount $R_{500}^{HVS}$ according to a difference in luminance between the adjacent pixels based on the HVS recognition information (e.g., graph illustrated in FIG. 6).

Meanwhile, the electronic device 100 according to an embodiment of the disclosure may obtain a plurality of images by applying a plurality of tone mapping curves to the input image 10. Herein, each of the plurality of images may be an image based on 500 nits. The electronic device 100 may obtain a luminance value of each of the plurality of images based on the mapping information. In addition, the electronic device 100 may obtain an HVS recognition response amount $R_{500}^{HVS}$ of each of the plurality of images.

Figure 8:
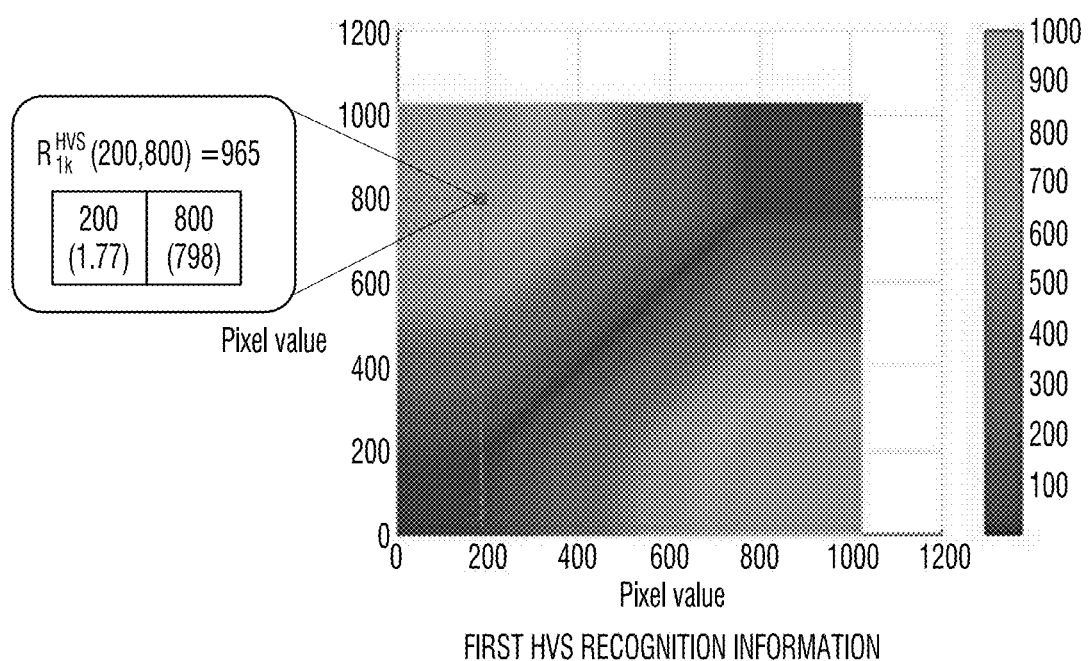
FIGS. 8 and 9 are diagrams illustrating a difference in luminance between adjacent pixels according to an embodiment.
Figure 9:
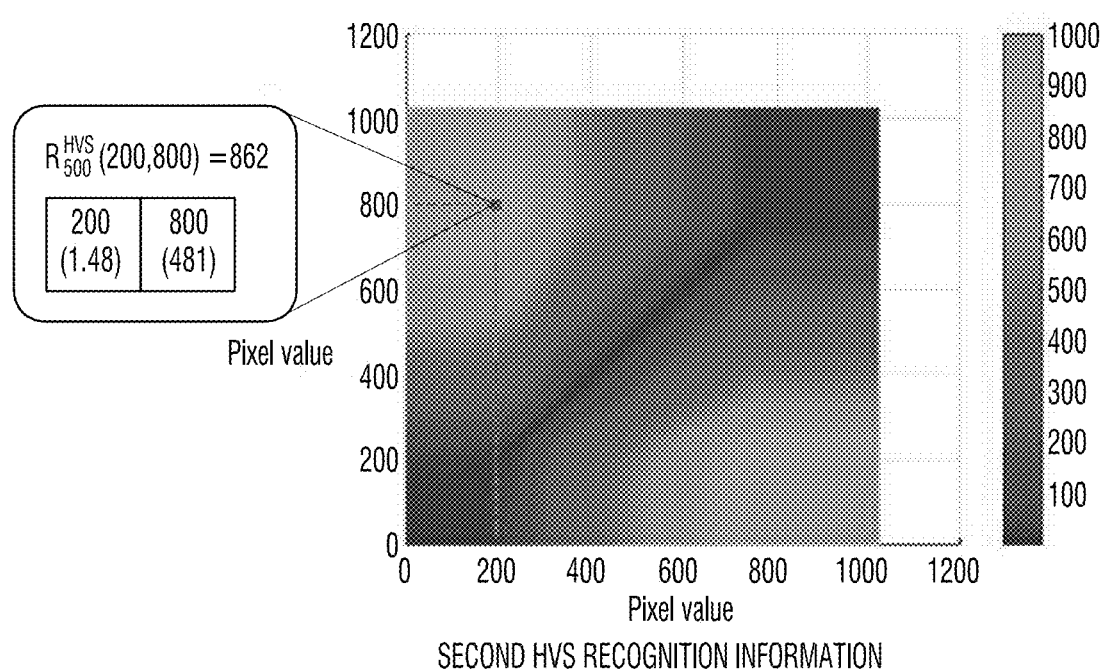

FIGS. 8 and 9 are diagrams illustrating a difference in luminance between adjacent pixels according to an embodiment.

The first human visual system (HVS) recognition information according to a difference in luminance between adjacent pixels based on the first maximum output luminance according to an embodiment may be in a form of a 2D histogram.

Referring to FIG. 8, an X axis indicates a gradation value of a pixel and a Y axis indicates a gradation value of a pixel adjacent to the corresponding pixel. A (m, n)-th element $R_x^{HVS}$ (m, n) on the 2D histogram may represent the HVS recognition response amount according to a difference in luminance between adjacent pixels, when the gradation value of the pixel in the image is m and the gradation value of the pixel adjacent to the corresponding pixel is n. For example, it may be assumed that a luminance value corresponding to a gradation value of 200 of the input image 10 is 1.77 and a luminance value corresponding to a gradation value of 800 of the input image 10 is 798 based on the mapping information. The electronic device 100 may obtain the HVS recognition response amount 965 ($R_{1k}^{HVS}$ (200, 800)=965) according to a difference between the luminance value of 1.77 and the luminance value of 798 based on the HVS recognition information (e.g., graph illustrated in FIG. 6).

The first HVS recognition information illustrated in FIG. 8 is a 2D histogram obtained by modeling the HVS recognition response amount according to a difference in luminance between adjacent pixels by assuming that a gradation value of a pixel is 0 to 1023 and a gradation value of a pixel adjacent to the corresponding pixel is 0 to 1023 based on the first maximum output luminance (e.g., 1,000 nits).

In an example, when the gradation value of the pixel is the same as the gradation value of the pixel adjacent to the corresponding pixel, a difference in luminance may be 0 and the HVS recognition response amount may be 0 (e.g., $R_{1k}^{HVS}$ (300,300)=0).

The electronic device 100 according to an embodiment of the disclosure may obtain a third histogram regarding a difference in luminance between adjacent pixels of the input image 10 based on the first HVS recognition information.

The second HVS recognition information illustrated in FIG. 9 is a 2D histogram obtained by modelling the HVS recognition response amount according to a difference in luminance between adjacent pixels based on the second maximum output luminance (e.g., 500 nits).

Referring to FIG. 9, it may be assumed that a luminance value corresponding to a gradation value of 200 of the image 20 based on 500 nits is 1.48 and a luminance value corresponding to a gradation value of 800 of the image 20 based on 500 nits is 481 based on the mapping information. The electronic device 100 may obtain the HVS recognition response amount of 862 ($R_{500}^{HVS}$ (200,800)=862) according to a difference between the luminance value of 1.48 and the luminance value of 481 based on the HVS recognition information (e.g., graph illustrated in FIG. 6).

The second HVS recognition information illustrated in FIG. 9 is a 2D histogram obtained by modelling the HVS recognition response amount according to a difference in luminance between adjacent pixels by assuming that the gradation value of the pixel is 0 to 1023 and the gradation value of the pixel adjacent to the corresponding pixel is 0 to 1023 based on the second maximum output luminance (e.g., 500 nits).

The electronic device 100 according to an embodiment of the disclosure may obtain a fourth histogram regarding a difference in luminance between adjacent pixels of the image 20 based on 500 nits based on the second HVS recognition information.

Figure 10:
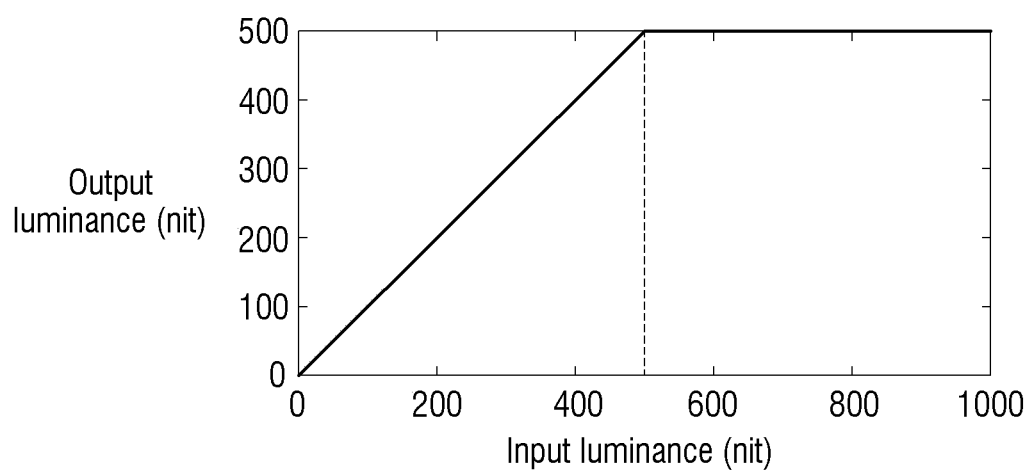
FIG. 10 is a diagram illustrating a guide tone mapping curve according to an embodiment.

FIG. 10 is a diagram illustrating a guide tone mapping curve according to an embodiment.

The electronic device 100 according to an embodiment of the disclosure may obtain a guide image by applying a guide tone mapping curve to the input image and obtain a fifth histogram regarding a difference in gradation between adjacent pixels of the guide image.

In an example, the guide tone mapping curve may be any one of a plurality of tone mapping curves for outputting the input image with luminance of 0 to 500 nits. Referring to FIG. 10, the guide tone mapping curve according to an embodiment of the disclosure may a curve for outputting the luminance of 0 to 500 nits as it is and adjusting and outputting the luminance of 500 nits to 1,000 nits to 500 nits among the luminance values corresponding to the gradation value of each pixel of the input image. However, there is no limitation thereto. For example, the guide tone mapping curve may be a curve for linearly mapping the luminance value corresponding to the gradation value of the input image of 0 to 1,000 nits with the luminance value of 0 to 500 nits.

The electronic device 100 according to an embodiment of the disclosure may obtain a fifth histogram regarding a difference in gradation between adjacent pixels of a guide image obtained by applying the guide tone mapping curve to the input image.

In an example, the electronic device 100 may obtain a difference in gradation between a pixel positioned at (x, y) of the guide image obtained by adjusting the gradation of the input image and a pixel positioned at (x+1, y) adjacent to the corresponding pixel, and obtain the fifth histogram based on the difference in gradation. The input image with the gradation adjusted according to the guide tone mapping curve may be output with the luminance of 0 to 500 nits.

The electronic device 100 according to an embodiment may obtain a luminance value regarding the input image corresponding to the second maximum output luminance based on a difference between the second and fifth histograms based on the following Mathematic Expression 4.

$$\underset{H_{500}}{\text{minimize}} \|W \odot (H_{500} - H_g)\|_F^2 \qquad \text{[Mathematical Expression 4]}$$

Herein, $H_{500}$ represents a second histogram, $H_g$ represents a fifth histogram, and W represents a weight.

The electronic device 100 according to an embodiment of the disclosure may identify a tone mapping curve for minimizing a difference between the second and fifth histograms among the plurality of tone mapping curves, and obtain a luminance value regarding the input image corresponding to the second maximum output luminance by applying the identified tone mapping curve to the input image. For example, the electronic device 100 may obtain a difference between the second and fifth histograms based on any one guide tone mapping curve among the plurality of tone mapping curves, and obtain a difference between the second and fifth histograms based on a tone mapping curve different from the guide tone mapping curve among the plurality of tone mapping curves. The electronic device 100 may identify the tone mapping curve corresponding to a comparatively small difference among these. Meanwhile, Mathematic Expression 4 may be an expression related to maintaining of the luminance of the input image.

Meanwhile, the electronic device 100 according to an embodiment of the disclosure may apply a weight to a difference between the second and fifth histograms. The weight herein may be inversely proportional to the gradation value of each pixel of the input image.

According to the HVS recognition information, the visual sense of a person is relatively more sensitive with the low luminance, compared to the high luminance. For example, the HVS recognition response amount according to a change in luminance of 0 to 150 nits which is low luminance is greater than the HVS recognition response amount according to a change in luminance of 500 to 1,000 nits which is high luminance. The electronic device 100 according to an embodiment of the disclosure may obtain a weight inversely proportional to the gradation value of each pixel of the input image, in order to maintain the low gradation and low luminance of the input image as much as possible. In an example, the electronic device 100 may obtain the weight based on Mathematic Expression 5.

$$W(i,j)=1023-\max(i,j) \qquad \text{[Mathematic Expression 5]}$$

Herein, i represents a gradation value of a pixel and j represents a gradation value of a pixel adjacent to the corresponding pixel.

Figure 11:
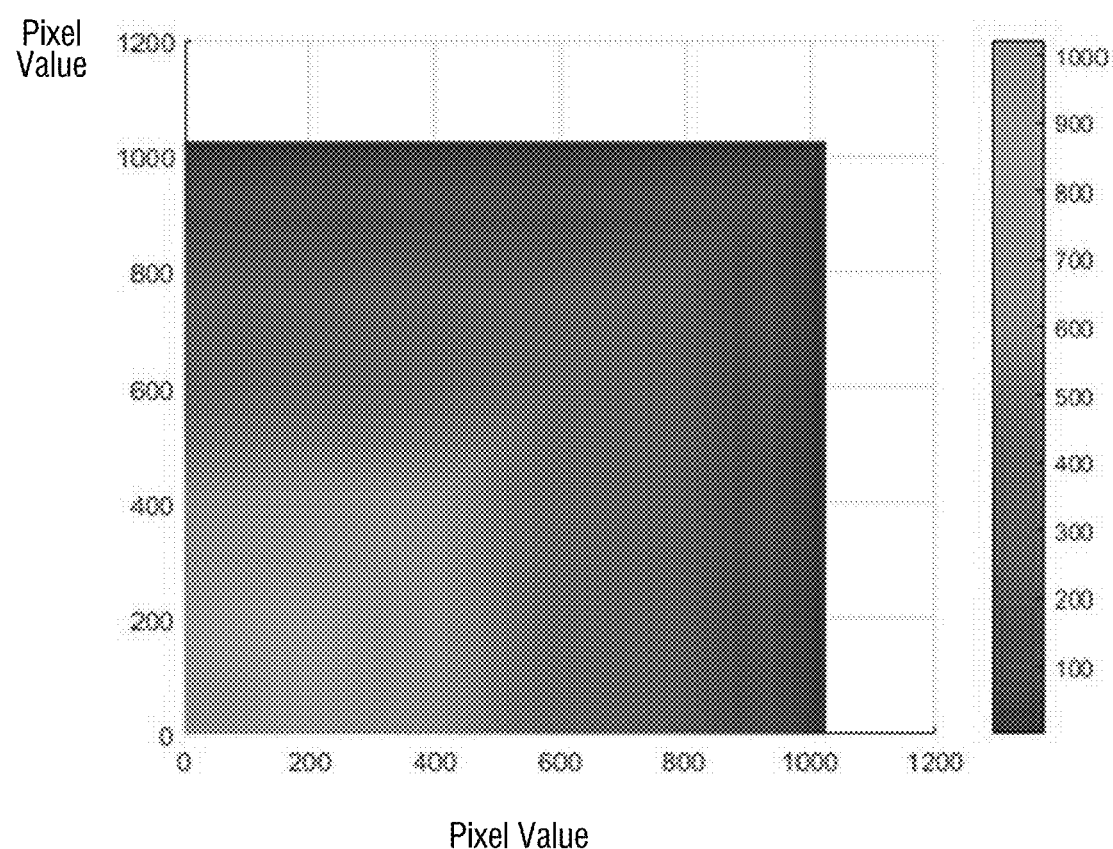
FIG. 11 is a diagram illustrating a weight according to an embodiment.

FIG. 11 is a diagram illustrating a weight according to an embodiment.

A weight histogram as illustrated in FIG. 11 may be obtained based on Mathematic Expression 5. An X axis of the weight is a gradation value of a pixel and a Y axis is a gradation value of a pixel adjacent to the corresponding pixel.

The visual sense of a person is relatively more sensitive with the low luminance compared to the high luminance. Accordingly, if both of a gradation value of a pixel and a gradation value of a pixel positioned to be adjacent to the corresponding pixel are relatively low, the electronic device 100 may apply a high weight (e.g., weight close to 1023). In another example, if both of a gradation value of a pixel and a gradation value of a pixel positioned to be adjacent to the corresponding pixel are relatively high, the electronic device 100 may apply a low weight (e.g., weigh close to 0).

Meanwhile, in the various embodiments of the disclosure, it is assumed that the input image has a luminance value of 0 to 1,000 nits according to the HDR10 standard and it is assumed that the input image has a gradation value of 0 to 1023 as a 10-bit image. However, this is merely an embodiment and is not limited thereto. For example, the input image may have a luminance value of 0 to 500 nits and may have a gradation value of 0 to 255 as an 8-bit image. In this case, the electronic device 100 may also obtain a weight W based on 255−max(i, j).

The electronic device 100 according to an embodiment of the disclosure may obtain a luminance value regarding the input image corresponding to the second maximum output luminance based on the following Mathematic Expression 6.

[Mathematical Expression 6]

$$\underset{H_{500}}{\text{minimize}} \; \alpha \|H_{1k} \odot R_{1k}^{HVS} - H_{500} \odot R_{500}^{HVS}\|_F^2 + (1-\alpha)\|W \odot (H_{500} - H_g)\|_F^2$$

Herein, α (0≤α≤1) represents a first weight representing importance. For example, if the HVS recognition response has to be relatively emphasized than the maintaining of the luminance of the input image, α may approach 1. In another example, if the maintaining of the luminance of the input image has to be relatively emphasized than the HVS recognition response, a may approach 0.

FIG. 12 is a diagram illustrating a weight matrix according to an embodiment.

The electronic device 100 according to an embodiment of the disclosure may obtain a sixth histogram by applying a weight matrix to the second histogram.

According to an embodiment, in order to prevent a rapid change of the tone mapping curve according to the feature of the input image, the electronic device may obtain a sixth histogram based on Mathematic Expression 7.

$$H_{500}^{minimize} \|H_{500}D\|_F^2 \quad \text{[Mathematic Expression 7]}$$

Herein, $H_{500}$ represents a second histogram and D represents a weight matrix.

Referring to FIG. 12, the weight matrix may be a diagonal matrix for applying 1 to elements in a diagonal direction. In an example, the weight matrix may be a double diagonal matrix for applying 1 to an element in the diagonal direction, applying −1 to an element positioned to be adjacent to the corresponding element, and applying 0 to the remaining elements.

The electronic device 100 may apply the weight matrix to the second histogram to prevent a rapid change of the tone mapping curve. Meanwhile, the weight matrix illustrated in FIG. 12 is merely an embodiment and is not limited thereto. For example, the weight matrix may be a tridiagonal matrix. The matrices having various forms may be set as the weight matrix according to a purpose of a manufacturer, a feature of an image, and the like.

Figure 13A:
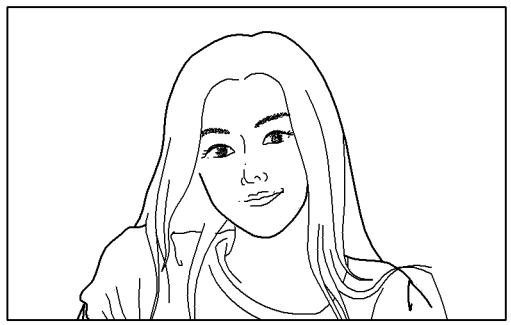
FIGS. 13A and 13B are a diagram illustrating a luminance value of an input image according to an embodiment.
Figure 13B:
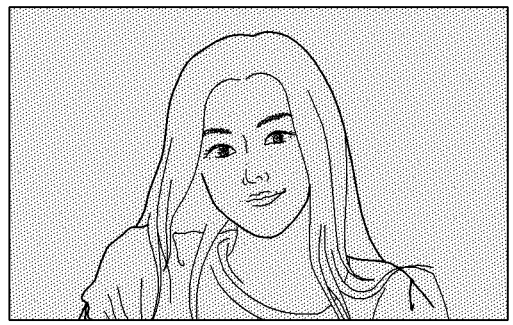

FIGS. 13A and 13B are is a diagram illustrating a luminance value of an input image according to an embodiment.

The electronic device 100 according to an embodiment of the disclosure may obtain a luminance value regarding the input image corresponding to the second maximum output luminance based on the following Mathematic Expression 8.

[Mathematical Expression 8]

$$\underset{H_{500}}{\text{minimize}} \; \alpha \|H_{1k} \odot R_{1k}^{HVS} - H_{500} \odot R_{500}^{HVS}\|_F^2 +$$

$$(1-\alpha)\|W \odot (H_{500} - H_g)\|_F^2 + \beta\|H_{500}D\|_F^2$$

Herein, $H_{1k}$ represents a first histogram, $H_{500}$ represents a second histogram, $R_{1k}^{HVS}$ represents a third histogram, $R_{500}^{HVS}$ represents a fourth histogram, $H_g$ represents a fifth histogram, $H_{500}D$ represents a sixth histogram, $H_{1k} \odot R_{1k}^{HVS}$ represents a first value, $H_{500} \odot R_{500}^{HVS}$ represents a second value, D represents a weight matrix, α represents a first weight, and β represents a second weight.

According to an embodiment, the electronic device 100 may select a second histogram for minimizing a sum of a difference between the first value and the second value, a difference between the second and fifth histograms, and the sixth histogram among the plurality of second histograms based on Mathematic Expression 8. Then, the electronic device 100 may identify a fourth histogram corresponding to the second histogram. The electronic device 100 may identify a tone mapping curve corresponding to the selected second histogram among the plurality of tone mapping curves and adjust luminance of the input image by applying the identified tone mapping curve to the input image. Herein, the input image having the adjusted luminance may be output with the luminance of 0 to 500 nits. The input image having the adjusted luminance may refer to an image based on 500 nits.

Referring to FIG. 13A, it is assumed that the input image is output by the electronic device having the maximum outputable luminance of 1,000 nits, and referring to FIG. 13B, it is assumed that the input image is output by the electronic device having the maximum outputable luminance of 500 nits. In the related art, the maximum output luminance was adjusted from 1,000 nits to 500 nits by applying only the linear tone mapping curve or the static tone mapping curve. Accordingly, a sense of difference, a difference, a degree of deterioration, and a degree of distortion according to the human visual system (HVS) were high. The electronic device 100 according to an embodiment of the disclosure may maintain the dynamic range width and the like as much as possible and output the input image with the luminance of 0 to 500 nits while minimizing the degree of deterioration according to the human visual system.

Figure 14:
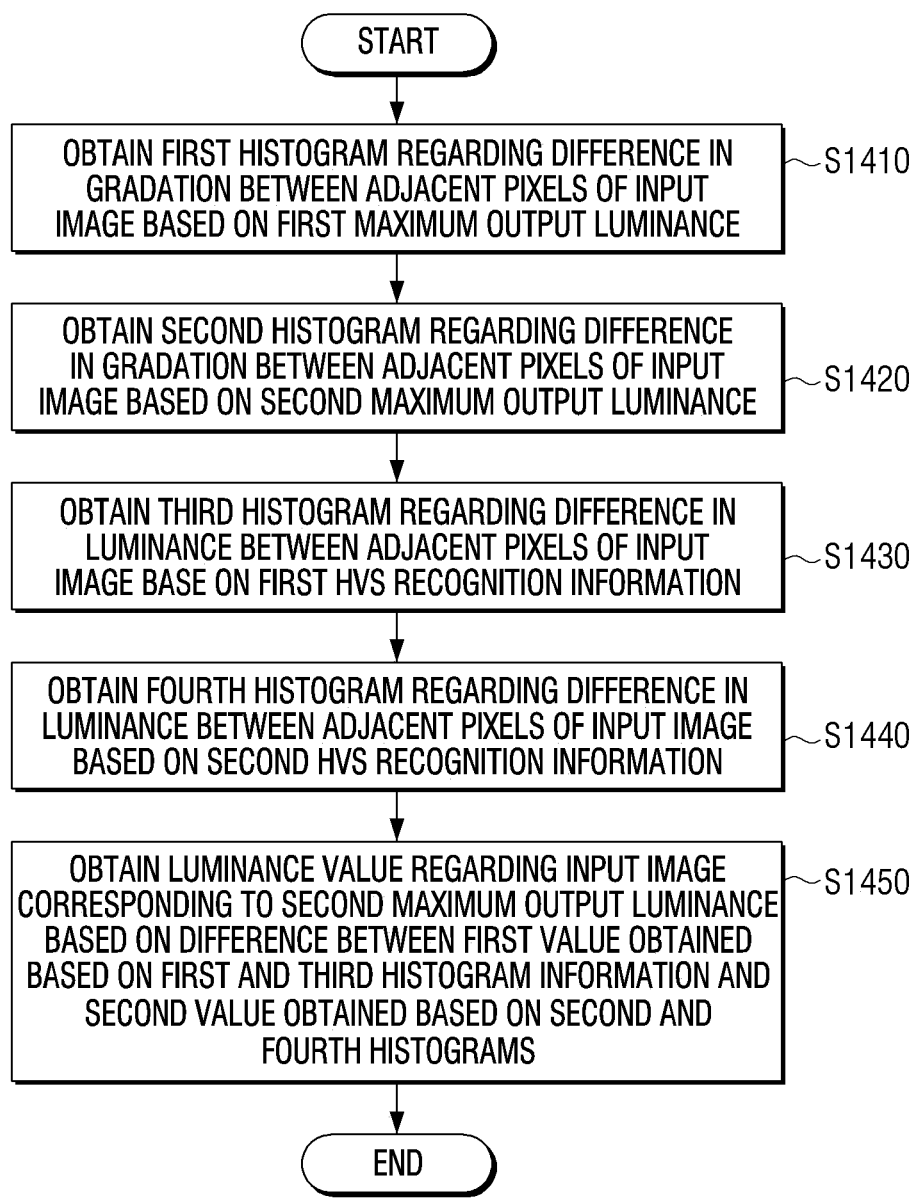
FIG. 14 is a flowchart illustrating a method for controlling an electronic device according to an embodiment.

FIG. 14 is a flowchart illustrating a method for controlling an electronic device according to an embodiment.

Meanwhile, according to an embodiment of the disclosure, a method for controlling an electronic device storing first human visual system (HVS) recognition information according to a difference in luminance between adjacent pixels based on first maximum output luminance and second HVS recognition information according to a difference in luminance between adjacent pixels based on second maximum output luminance may firstly include obtaining a first histogram regarding a difference in gradation between adjacent pixels of an input image based on the first maximum output luminance (S1410).

A second histogram regarding a difference in gradation between adjacent pixels of the input image may be obtained based on the second maximum output luminance (S1420).

A third histogram regarding a difference in luminance between adjacent pixels of the input image may be obtained based on the first HVS recognition information (S1430).

A fourth histogram regarding a difference in luminance between adjacent pixels of the input image may be obtained based on the second HVS recognition information (S1440).

A luminance value regarding the input image corresponding to the second maximum output luminance may be obtained based on a difference between a first value obtained based on the first and third histogram information and a second value obtained based on the second and fourth histograms (S1450).

The control method according to an embodiment of the disclosure may include obtaining a guide image by applying a guide tone mapping curve according to the second maximum output luminance to the input image, and obtaining a fifth histogram regarding a difference in gradation between adjacent pixels of the guide image, and the step S1450 of obtaining the luminance value regarding the input image may include obtaining a luminance value regarding the input image corresponding to the second maximum output luminance based on a difference the first value and the second value and a difference between the second and fifth histograms.

The step S1450 of obtaining the luminance value regarding the input image may include obtaining a luminance value regarding the input image by applying a weight inversely proportional to a gradation value of each pixel of the input image to the difference between the second and fifth histograms.

The step S1420 of obtaining the second histogram may include obtaining a plurality of second histograms regarding a difference in gradation between adjacent pixels of the input image based on the second maximum output luminance, and the step S1450 of obtaining the luminance value regarding the input image may include obtaining a plurality of second values based on a product between a plurality of elements included in each of the plurality of second histograms and a plurality of elements included in the corresponding fourth histogram, selecting one of the plurality of second histograms based on each of the plurality of second values and the first value, and obtaining a luminance value regarding the input image based on a fourth histogram corresponding to the selected second histogram.

The step S1420 of obtaining the second histogram may include obtaining a plurality of images by applying a plurality of tone mapping curves to the input image, and obtaining the plurality of second histograms based on a difference in gradation between adjacent pixels included in the plurality of images, and the step S1450 of obtaining the luminance value regarding the input image may include selecting a tone mapping curve corresponding to the selected second histogram among the plurality of tone mapping curves, and obtaining a luminance value regarding the input image by applying the selected tone mapping curve to the input image.

The step S1430 of obtaining the third histogram may include obtaining a luminance value corresponding to a gradation value of each of a plurality of pixels included in the input image based on mapping information regarding a gradation value of an image stored in the electronic device and a corresponding luminance value, and obtaining the third histogram based on the first HVS recognition information and the obtained luminance value, and the step S1440 of obtaining the fourth histogram may include obtaining a luminance value corresponding to a gradation value of each of the plurality of pixels included in the input image based on the mapping information, and obtaining the fourth histogram based on the second HVS recognition information and the obtained luminance value.

The step S1410 of obtaining the first histogram may include obtaining a plurality of scaled images by scaling the input image to different sizes, obtaining a plurality of histograms regarding a difference in gradation between adjacent pixels of the plurality of scaled images based on the first maximum output luminance, and applying different weights to the plurality of histograms and obtaining the first histogram by adding up the plurality of histograms to which the weights are applied.

The control method according to an embodiment of the disclosure may further include obtaining a sixth histogram by applying a weight matrix to the second histogram, and the step S1450 of obtaining the luminance value regarding the input image may include obtaining a luminance value regarding the input image corresponding to the second maximum output luminance based on the difference between the first value and the second value, the difference between the second and fifth histograms, and the sixth histogram, and the weight matrix may be a diagonal matrix for applying 1 to elements in a diagonal direction.

The step S1450 of obtaining the luminance value regarding the input image may include obtaining a luminance value regarding the input image based on the following mathematic expression.

Meanwhile, the methods according to the various embodiments of the disclosure may be implemented in a form of an application installable on an electronic device of the related art.

$$\underset{H_{500}}{\text{minimize}} \quad \alpha \|H_{1k} \odot R_{1k}^{HVS} - H_{500} \odot R_{500}^{HVS}\|_F^2 + (1-\alpha)\|W \odot (H_{500} - H_g)\|_F^2 + \beta\|H_{500}D\|_F^2$$

Herein, $H_{1k}$ represents a first histogram, $H_{500}$ represents a second histogram, $R_{1k}^{HVS}$ represents a third histogram, represents a fourth histogram, $H_g$ represents a fifth histogram, $H_{500} \odot R_{500}^{HVS}$ represents a sixth histogram, $H_{1k} \odot R_{1k}^{HVS}$ represents a first value, $H_{500} \odot R_{500}^{HVS}$ represents a second value, D represents a weight matrix, α represents a first weight, and β represents a second weight.

In addition, the methods according to the various embodiments of the disclosure described above may be implemented simply by the software upgrade or hardware upgrade in the electronic device of the related art.

Further, the embodiments of the disclosure described above may be performed through an embedded server provided in the electronic device or an external server of the electronic device.

The embodiments described above may be implemented in a recording medium readable by a computer or a similar device using software, hardware, or a combination thereof. In some cases, the embodiments described in this specification may be implemented as a processor itself. According to the implementation in terms of software, the embodiments such as procedures and functions described in this specification may be implemented as separate software modules. Each of the software modules may perform one or more functions and operations described in this specification.

Computer instructions for executing processing operations according to the embodiments of the disclosure descried above may be stored in a non-transitory computer-readable medium. When the computer instructions stored in such a non-transitory computer-readable medium are executed by the processor, the computer instructions may enable a specific machine to execute the processing operations according to the embodiments described above.

The non-transitory computer-readable medium is not a medium storing data for a short period of time such as a register, a cache, or a memory, but may refer to a medium that semi-permanently stores data and is readable by a machine. Specific examples of the non-transitory computer-readable medium may include a CD, a DVD, a hard disk drive, a Blu-ray disc, a USB, a memory card, and a ROM.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic device comprising:
a storage configured to store first human visual system (HVS) recognition information according to a difference in luminance between adjacent pixels based on first maximum output luminance and second HVS recognition information according to a difference in luminance between adjacent pixels based on second maximum output luminance; and
a processor configured to,
obtain a first histogram regarding a difference in gradation between adjacent pixels of an input image based on the first maximum output luminance,
obtain a second histogram regarding a difference in gradation between adjacent pixels of the input image based on the second maximum output luminance,
obtain a third histogram regarding a difference in luminance between adjacent pixels of the input image based on the first HVS recognition information,
obtain a fourth histogram regarding a difference in luminance between adjacent pixels of the input image based on the second HVS recognition information, and
obtain a luminance value regarding the input image corresponding to the second maximum output luminance based on a difference between a first value obtained based on the first and third histogram information and a second value obtained based on the second and fourth histograms.

2. The device according to claim 1, wherein the processor is configured to:
obtain a guide image by applying a guide tone mapping curve according to the second maximum output luminance to the input image,
obtain a fifth histogram regarding a difference in gradation between adjacent pixels of the guide image, and
obtain a luminance value regarding the input image corresponding to the second maximum output luminance based on the difference between the first value and the second value and a difference between the second and fifth histograms.

3. The device according to claim 2, wherein the processor is configured to obtain a luminance value regarding the input image by applying a weight inversely proportional to a gradation value of each pixel of the input image to the difference between the second and fifth histograms.

4. The device according to claim 2, wherein the processor is configured to obtain a sixth histogram by applying a weight matrix to the second histogram, and obtain a luminance value regarding the input image corresponding to the second maximum output luminance based on the difference between the first value and the second value, the difference between the second and fifth histograms, and the sixth histogram, and
wherein the weigh matrix is a diagonal matrix for applying 1 to elements in a diagonal direction.

5. The device according to claim 1, wherein the processor is configured to:
obtain a plurality of second histograms regarding a difference in gradation between adjacent pixels of the input image based on the second maximum output luminance;
obtain a plurality of fourth histograms corresponding to the plurality of second histograms based on the second HVS recognition information;
obtain a plurality of second values based on a product between a plurality of elements included in each of the plurality of second histograms and a plurality of elements included in the corresponding fourth histogram; and
select one of the plurality of second histograms based on a difference value between each of the plurality of second values and the first value, and obtain a luminance value regarding the input image based on a fourth histogram corresponding to the selected second histogram.

6. The device according to claim 5, wherein the processor is configured to:
obtain a plurality of images by applying a plurality of tone mapping curves to the input image, and obtain the plurality of second histograms based on a difference in gradation between adjacent pixels included in the plurality of images; and
identify a tone mapping curve corresponding to the selected second histogram among the plurality of tone mapping curves and obtain a luminance value regarding the input image by applying the identified tone mapping curve to the input image.

7. The device according to claim 1, wherein the storage is configured to store mapping information regarding a gradation value of an image and a corresponding luminance value, and
wherein the processor is configured to obtain a luminance value corresponding to a gradation value of each of a plurality of pixels included in the input image based on the mapping information, and obtain the third and fourth histograms based on the obtained luminance value.

8. The device according to claim 1, wherein the processor is configured to:
obtain a plurality of scaled images by scaling the input image to different sizes;
obtain a plurality of histograms regarding a difference in gradation between adjacent pixels of the plurality of scaled images based on the first maximum output luminance; and
obtain the first histogram by applying different weights to the plurality of histograms and adding up the plurality of histograms to which the weights are applied.

9. A method for controlling an electronic device storing first human visual system (HVS) recognition information according to a difference in luminance between adjacent pixels based on first maximum output luminance and second HVS recognition information according to a difference in luminance between adjacent pixels based on second maximum output luminance, the method comprising:

obtaining a first histogram regarding a difference in gradation between adjacent pixels of an input image based on the first maximum output luminance;

obtaining a second histogram regarding a difference in gradation between adjacent pixels of the input image based on the second maximum output luminance;

obtaining a third histogram regarding a difference in luminance between adjacent pixels of the input image based on the first HVS recognition information;

obtaining a fourth histogram regarding a difference in luminance between adjacent pixels of the input image based on the second HVS recognition information; and obtaining a luminance value regarding the input image corresponding to the second maximum output luminance based on a difference between a first value obtained based on the first and third histogram information and a second value obtained based on the second and fourth histograms.

10. The method according to claim 9, further comprising:

obtaining a guide image by applying a guide tone mapping curve according to the second maximum output luminance to the input image; and obtaining a fifth histogram regarding a difference in gradation between adjacent pixels of the guide image, wherein the obtaining the luminance value regarding the input image comprises obtaining a luminance value regarding the input image corresponding to the second maximum output luminance based on the difference between the first value and the second value and a difference between the second and fifth histograms.

11. The method according to claim 10, wherein the obtaining the luminance value regarding the input image comprises obtaining a luminance value regarding the input image by applying a weight inversely proportional to a gradation value of each pixel of the input image to the difference between the second and fifth histograms.

12. The method according to claim 9, wherein the obtaining the second histogram comprises obtaining a plurality of second histograms regarding a difference in gradation between adjacent pixels of the input image based on the second maximum output luminance, and wherein the obtaining the luminance value regarding the input image comprises:

obtaining a plurality of second values based on a product between a plurality of elements included in each of the plurality of second histograms and a plurality of elements included in the corresponding fourth histogram;

selecting one of the plurality of second histograms based on a difference value between each of the plurality of second values and the first value; and obtaining a luminance value regarding the input image based on a fourth histogram corresponding to the selected second histogram.

13. The method according to claim 12, wherein the obtaining the second histogram comprises:

obtaining a plurality of images by applying a plurality of tone mapping curves to the input image; and obtaining the plurality of second histograms based on a difference in gradation between adjacent pixels included in the plurality of images; and wherein the obtaining the luminance value regarding the input image comprises:

identifying a tone mapping curve corresponding to the selected second histogram among the plurality of tone mapping curves; and obtaining a luminance value regarding the input image by applying the identified tone mapping curve to the input image.

14. The method according to claim 9, wherein the obtaining the third histogram comprises:

obtaining a luminance value corresponding to a gradation value of each of a plurality of pixels included in the input image based on mapping information regarding a gradation value of an image stored in the electronic device and a corresponding luminance value; and obtaining the third histogram based on the first HVS recognition information and the obtained luminance value, and wherein the obtaining the fourth histogram comprises:

obtaining a luminance value corresponding to a gradation value of each of the plurality of pixels included in the input image based on the mapping information; and obtaining the fourth histogram based on the second HVS recognition information and the obtained luminance value.

* * * * *